United States Patent
Smith et al.

(10) Patent No.: US 7,792,137 B2
(45) Date of Patent: Sep. 7, 2010

(54) SELF-ORGANIZED AND SELF-MANAGED AD HOC COMMUNICATIONS NETWORK

(75) Inventors: David M. Smith, Marietta, GA (US); G. Allan Whittaker, Alpharetta, GA (US)

(73) Assignee: Abidanet, LLC, Marietta, GA (US)

( * ) Notice: Subject to any disclaimer, the term of this patent is extended or adjusted under 35 U.S.C. 154(b) by 961 days.

(21) Appl. No.: 11/428,594

(22) Filed: Jul. 5, 2006

(65) Prior Publication Data
US 2008/0013566 A1 Jan. 17, 2008

(51) Int. Cl.
*H04L 12/413* (2006.01)
(52) U.S. Cl. .................. 370/447; 370/257; 370/394
(58) Field of Classification Search .............. 370/431, 370/445, 447, 351, 389, 394, 254
See application file for complete search history.

(56) References Cited

U.S. PATENT DOCUMENTS

| | | |
|---|---|---|
| 4,486,739 A | 12/1984 | Franaszek et al. |
| 4,731,880 A | 3/1988 | Ault et al. |
| 4,926,419 A | 5/1990 | Whipple |
| 4,935,877 A | 6/1990 | Koza |
| 5,245,605 A | 9/1993 | Ofek |
| 5,377,187 A | 12/1994 | Spiotta et al. |
| 5,400,323 A | 3/1995 | Frenzell, III et al. |
| 5,402,422 A | 3/1995 | Liu et al. |
| 5,434,861 A | 7/1995 | Pritty et al. |
| 5,517,622 A | 5/1996 | Ivanoff et al. |
| 5,568,476 A | 10/1996 | Sherer et al. |
| 5,732,086 A | 3/1998 | Liang et al. |
| 5,742,608 A | 4/1998 | Randrianaliminana et al. |
| 5,802,048 A | 9/1998 | Duckwall |
| 5,802,057 A | 9/1998 | Duckwall et al. |
| 5,838,688 A | 11/1998 | Kadambi et al. |
| 5,850,525 A | 12/1998 | Kalkunte et al. |
| 5,883,894 A | 3/1999 | Patel et al. |
| 5,890,001 A | 3/1999 | Hall |
| 5,898,801 A | 4/1999 | Braun et al. |
| 5,995,549 A | 11/1999 | Crane |
| 6,029,202 A | 2/2000 | Frazier et al. |
| 6,065,052 A | 5/2000 | Van Loo |

(Continued)

FOREIGN PATENT DOCUMENTS

EP 439646 A1 * 8/1991

OTHER PUBLICATIONS

Search Report and Written Opinion for International Patent Application No. PCT/US2007/072114; Feb. 4, 2008.

*Primary Examiner*—William Trost, IV
*Assistant Examiner*—Siming Liu
(74) *Attorney, Agent, or Firm*—Bryan Cave LLP; Charles L. Warner

(57) ABSTRACT

A self-organized and self-managed ad hoc network operates without the intervention of arbitration, collision detectors, hubs, master controllers, switches, or routers. The network may include both fixed and/or mobile stations. A self-organized and self-managed order of transmission sequence is automatically determined by the stations in the network, and then each station transmits in the order defined by that sequence. Stations can join in, or drop out of, the network at any time with little to no disruption of the network, and the transmission sequence is automatically updated to accommodate a joinder or removal.

21 Claims, 14 Drawing Sheets

U.S. PATENT DOCUMENTS

| | | | |
|---|---|---|---|
| 6,161,104 A | 12/2000 | Stakutis et al. | |
| 6,233,615 B1 | 5/2001 | Van Loo | |
| 6,295,516 B1 | 9/2001 | Takeyasu et al. | |
| 6,298,406 B1 | 10/2001 | Smyers | |
| 6,320,870 B1 | 11/2001 | Thaler | |
| 6,366,968 B1 | 4/2002 | Hunsaker | |
| 6,370,115 B1 | 4/2002 | Smith | |
| 6,389,501 B1 | 5/2002 | Garney et al. | |
| 6,449,283 B1 | 9/2002 | Chao et al. | |
| 6,457,081 B1 | 9/2002 | Gulick | |
| 6,463,472 B1 | 10/2002 | Van Loo | |
| 6,480,889 B1 | 11/2002 | Saito et al. | |
| 6,496,485 B1 | 12/2002 | Le | |
| 6,580,909 B1 * | 6/2003 | Carro | 455/435.1 |
| 6,633,572 B1 | 10/2003 | Olshansky et al. | |
| 6,636,526 B1 | 10/2003 | Nyu | |
| 6,643,723 B1 | 11/2003 | Heighway et al. | |
| 6,704,302 B2 | 3/2004 | Einbinder et al. | |
| 6,711,173 B2 | 3/2004 | Duckwall et al. | |
| 6,721,330 B2 | 4/2004 | Duckwall et al. | |
| 6,751,231 B2 | 6/2004 | Fellman et al. | |
| 6,765,923 B1 | 7/2004 | LaFollette et al. | |
| 6,771,668 B2 | 8/2004 | Fukunaga et al. | |
| 6,904,044 B2 | 6/2005 | Duckwall et al. | |
| 6,922,388 B1 | 7/2005 | Laroia et al. | |
| 6,947,442 B1 | 9/2005 | Sato et al. | |
| 6,956,814 B1 | 10/2005 | Campanella | |
| 6,970,481 B2 | 11/2005 | Gray, III et al. | |
| 6,973,513 B1 | 12/2005 | Chhabra et al. | |
| 6,975,324 B1 | 12/2005 | Valmiki et al. | |
| 6,977,919 B1 | 12/2005 | Stanwood | |
| 6,980,561 B1 | 12/2005 | Abi-Nassif | |
| 6,980,562 B2 | 12/2005 | Rudolf et al. | |
| 6,983,075 B2 | 1/2006 | Schwartz et al. | |
| 6,990,072 B2 | 1/2006 | Alasti et al. | |
| 6,993,042 B1 | 1/2006 | Akatsuka et al. | |
| 7,002,984 B1 | 2/2006 | Cheng | |
| 7,006,469 B1 | 2/2006 | Roark et al. | |
| 7,006,521 B2 | 2/2006 | Nguyen et al. | |
| 7,009,993 B2 | 3/2006 | Pronk et al. | |
| 7,012,927 B2 | 3/2006 | Nichols | |
| 7,023,874 B2 | 4/2006 | Hauck et al. | |
| 7,388,869 B2 * | 6/2008 | Butehorn et al. | 370/401 |
| 2001/0033579 A1 | 10/2001 | Nelson, Jr. et al. | |
| 2002/0018448 A1 | 2/2002 | Amis et al. | |
| 2002/0044565 A1 | 4/2002 | Park | |
| 2002/0085581 A1 | 7/2002 | Hauck et al. | |
| 2002/0093977 A1 | 7/2002 | Ono et al. | |
| 2002/0097741 A1 | 7/2002 | Tonella | |
| 2002/0101874 A1 | 8/2002 | Whittaker et al. | |
| 2002/0126691 A1 | 9/2002 | Strong | |
| 2002/0126693 A1 | 9/2002 | Stark et al. | |
| 2003/0007461 A1 * | 1/2003 | Chen et al. | 370/254 |
| 2003/0043840 A1 | 3/2003 | Kurokawa et al. | |
| 2003/0108060 A1 | 6/2003 | Black et al. | |
| 2003/0108061 A1 | 6/2003 | Black et al. | |
| 2003/0128665 A1 | 7/2003 | Bernhard et al. | |
| 2003/0185237 A1 | 10/2003 | Baker, Jr. | |
| 2003/0190919 A1 * | 10/2003 | Niemenmaa | 455/456.1 |
| 2004/0001502 A1 | 1/2004 | Gamire et al. | |
| 2004/0001503 A1 | 1/2004 | Manter | |
| 2004/0013128 A1 | 1/2004 | Moreton et al. | |
| 2004/0076173 A1 | 4/2004 | Marchetto | |
| 2004/0076434 A1 | 4/2004 | Whittaker et al. | |
| 2004/0223503 A1 | 11/2004 | Lynch et al. | |
| 2004/0252716 A1 | 12/2004 | Nemazie | |
| 2005/0047429 A1 | 3/2005 | Koo et al. | |
| 2005/0080912 A1 | 4/2005 | Finn | |
| 2005/0099974 A1 | 5/2005 | Kats et al. | |
| 2005/0111428 A1 * | 5/2005 | Orlik et al. | 370/344 |
| 2005/0135406 A1 | 6/2005 | Flemming | |
| 2005/0190701 A1 | 9/2005 | Bejerano et al. | |
| 2005/0190731 A1 | 9/2005 | Bejerano et al. | |
| 2005/0243857 A1 | 11/2005 | Hofstaedter et al. | |
| 2005/0243858 A1 | 11/2005 | Vitebsky et al. | |
| 2005/0276276 A1 | 12/2005 | Davis | |
| 2006/0039342 A1 | 2/2006 | Frank et al. | |
| 2006/0039400 A1 | 2/2006 | Mukhopadhyay et al. | |
| 2006/0056440 A1 | 3/2006 | Khartabil | |
| 2006/0067269 A1 | 3/2006 | Jugl et al. | |

\* cited by examiner

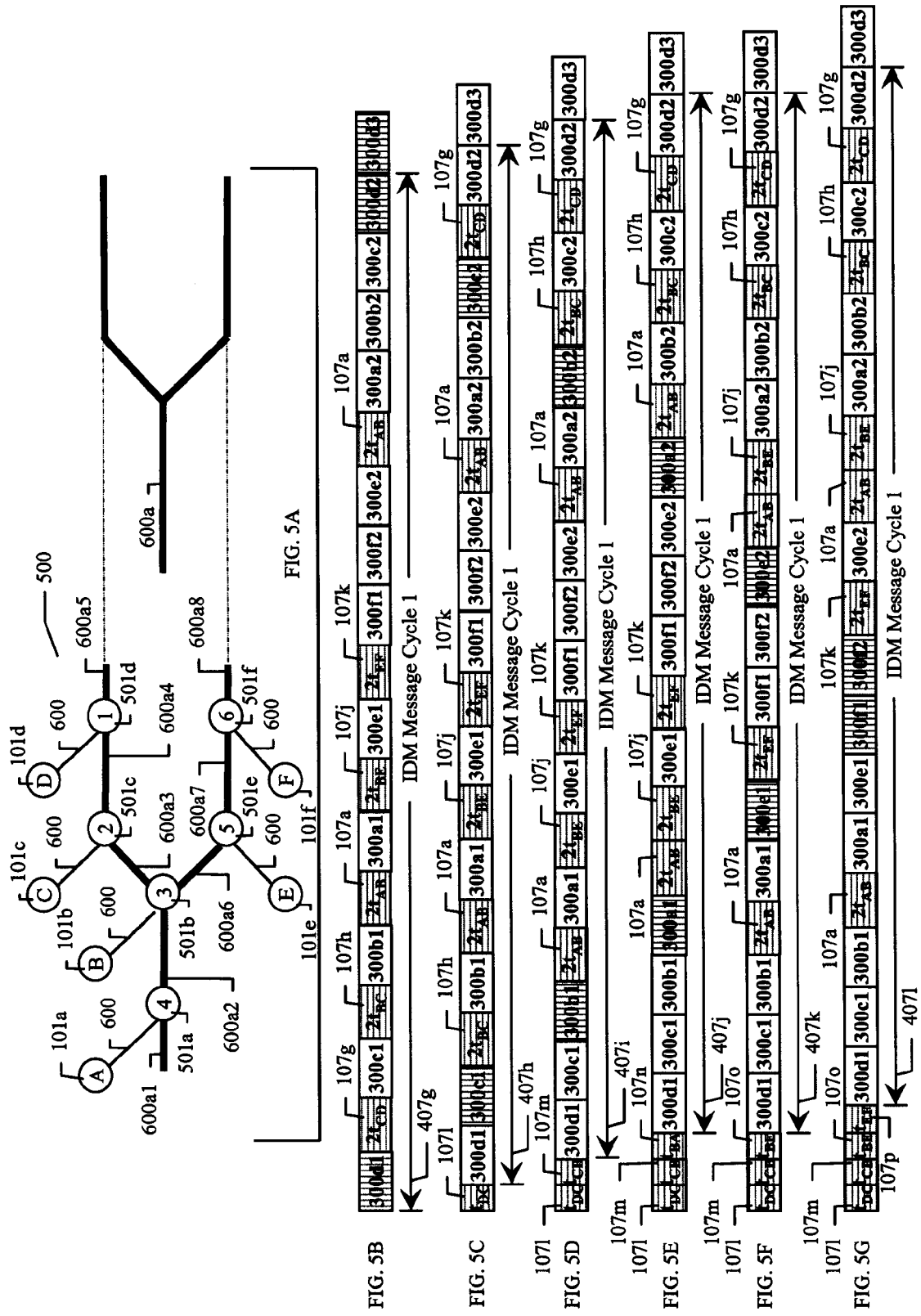

FIG. 6

| Transmission Media or Communications Media Examples |
|---|
| Wire(s) or wireline(s) |
| Organic conductor(s) |
| Semi-conductor(s) |
| Coaxial cable(s) |
| Multi mode optical fiber cable(s) |
| Single mode optical cable(s) |
| Hybrid coaxial-optical fiber cable(s) |
| Hybrid wire or wireline-optical fiber cable(s) |
| Hybrid wire or wireline-coaxial-optical fiber cable(s) |
| Electromagnetic radiation, for example, but not limited to: RF, and/or wireless and/or optical |
| Sub-divided electromagnetic radiation, for example, but not limited to: RF, and/or wireless and/or optical |
| Fluidic wave(s) propagation |
| Surface wave(s) propagation |
| Waveguide(s), for example and not limited to RF, and/or wireless, an/or optical |
| Energy distribution power lines, such as, but not limited to electricity power lines |
| Free Space |
| Anything capable of wave propagation |

| Network 500 Propagation Time | | |
|---|---|---|
| Definition | From BSTTS interface | To BSTTS interface |
| $t_{DC}$ 107l | 501d | 501c |
| $t_{CD}$ | 501c | 501d |
| $t_{CB}$ 107m | 501c | 501b |
| $t_{BC}$ | 501b | 501c |
| $t_{BA}$ 107n | 501b | 501a |
| $t_{AB}$ 107 | 501a | 501b |
| $t_{BE}$ 107o | 501b | 501e |
| $t_{EB}$ | 501e | 501b |
| $t_{FE}$ | 501f | 501e |
| $t_{EF}$ 107p | 501e | 501f |
| $t_{ED}$ | 501e | 501d |
| $t_{DF}$ | 501d | 501f |
| $t_{FC}$ | 501f | 501c |
| $t_{CA}$ | 501c | 501a |

FIG. 7B

| Network 500 Propagation Time Equivalents |
|---|
| $t_{DC}$ 107l = $t_{CD}$ |
| $t_{CB}$ 107m = $t_{BC}$ |
| $t_{BA}$ 107n = $t_{AB}$ 107 |
| $t_{BE}$ 107o = $t_{EB}$ |
| $t_{EF}$ 107p = $t_{FE}$ |
| $t_{ED} = t_{EB} + t_{BC} + t_{CD}$ |
| $t_{DF} = t_{DC}$ 107l + $t_{CB}$ 107m + $t_{BE}$ 107o + $t_{EF}$ 107p |
| $t_{FC} = t_{FE} + t_{EB} + t_{BC}$ |
| $t_{CA} = t_{CB}$ 107m + $t_{BA}$ 107n |

US 7,792,137 B2

SELF-ORGANIZED AND SELF-MANAGED AD HOC COMMUNICATIONS NETWORK

FIELD OF INVENTION

The present invention generally relates to networks and, more particularly, to self-organized, self-managed and efficient ad hoc communications networks, which provide for a number of opportunities for each station to transmit over a complete Authority To Transmit Sequence cycle, near-optimization of the network bandwidth using the Authority To Transmit Sequence, and/or adding and dropping stations without disrupting the network.

Portions of the disclosure herein contain material that is subject protected by copyright. The copyright owner has no objection to the facsimile reproduction by anyone of the patent document or the patent disclosure as it appears in the Patent and Trademark Office file and/or records, but otherwise reserves all rights in such copyrights.

ATTS™, BSTTS™, IDM™, and IDMA™ are trademarks and/or service marks of AbidaNet LLC.

BACKGROUND OF THE INVENTION

There is an ever-increasing need to automatically organize and manage ad hoc communications networks and obtain more bandwidth and/or better utilization of existing bandwidth for those networks, and for higher throughput. Even a basic discussion, however, of the numerous types of communications networks and protocols would occupy pages of material. Therefore, in order not to burden the knowledgeable reader with a discussion of the prior art, and in order to allow the reader to focus on the present invention, the prior art communications networks are not discussed in this background. Suffice it to say that the various prior art communications networks suffer from one or more problems, including failure to provide equal opportunity to transmit for all stations, failure to realistically provide for near-optimization of the transmission authority sequence, and failure to provide for adding and dropping stations without disrupting the network. For the interested reader, a detailed description of the operation and deficiencies of known prior art networks is provided in Appendix A, which is attached hereto, all of which is incorporated herein by reference as if fully set forth at this point in this Background.

SUMMARY

A method of operating a network is described. The network has a plurality of stations, each station being capable of transmitting and receiving. The network is preferably operated by defining an Authorization To Transmit Sequence (ATTS) which specifies the order in which the stations may transmit, the ATTS listing a first station, at least one intermediate station, and a last station, transmitting a message from the first station, transmitting a message from each of the intermediate stations in their order of listing, transmitting a message from the last station, reversing the order of the ATTS, transmitting another message from the last station, transmitting another message from each of the intermediate stations in their reverse order of listing, transmitting another message from the first station, and then repeating the process beginning with transmitting a message from the first station. A reverse ATTS is preferably used which specifies the order in which the stations may transmit and which order is reverse to that of the ATTS.

Another method of operating a network is also described. The network has a plurality of stations, each station being capable of transmitting and receiving. The network is preferably operated by obtaining an Authorization To Transmit Sequence (ATTS) which specifies the order in which the stations may transmit, the ATTS listing a first station, at least one intermediate station, and a last station, defining a reverse ATTS based upon the ATTS, the order in which the stations may transmit being reverse to the order of the ATTS, receiving messages, inspecting each message to determine if it was from a predecessor station in the ATTS or in the reverse ATTS, and if the message was from a predecessor station then, once that message is complete, transmitting a message.

In this method an option is to estimate the time at which a message from the predecessor station should be received and, if that estimated time has passed and a message has not been received from the predecessor station, then transmitting a message.

In this method another option is to estimate the time at which a message from the predecessor station should be received and, if that estimated time has passed and a message has not been received from the predecessor station, then removing that predecessor station from the ATTS and the reverse ATTS.

In this method still another option is to estimate the time at which a message from the predecessor station should be received and, if that estimated time has passed and a message has not been received from the predecessor station, then transmitting a message and removing that predecessor station from the ATTS and the reverse ATTS.

Another method of operating a network is also described. The network has a plurality of stations, each station being capable of transmitting and receiving. The network is preferably operated by obtaining an Authorization To Transmit Sequence (ATTS) which specifies the order in which the stations may transmit, the ATTS listing a first station, at least one intermediate station, and a last station, at a predetermined time, sending a pause message to invite a new station to join the network, if a reply message is received then sending a station identity and the ATTS to the new station, receiving a revised ATTS from the new station, the revised ATTS listing the new station, and transmitting a message in accordance with the revised ATTS.

In this method an option is to inspect each message to determine if it was from a predecessor station in the revised ATTS and, if the message was from a predecessor station, then, once that message is complete, beginning transmission of a message.

A method of operating a station wishing to join a network is also described, the network comprising a plurality of stations, each station being capable of transmitting and receiving. The station is preferably operated by listening on the network for a pause message inviting new stations to join the network, sending a reply to the pause message, receiving an Authorization To Transmit Sequence (ATTS) which specifies the order in which the stations may transmit, the ATTS listing a first station, at least one intermediate station, and a last station, determining propagation times between the joining station and at least some of the stations listed in the ATTS, determining a position in the ATTS where the joining station should be placed, defining a revised ATTS listing the joining station in that position, receiving a message authorizing the joining station to transmit, transmitting a message, the message including the revised ATTS, and transmitting further messages in accordance with the revised ATTS.

In this method an option is to determine the position so as to maintain network efficiency.

A method of operating a station wishing to join a network is also described, the network comprising a plurality of stations, each station being capable of transmitting and receiving. The station is preferably operated by listening on the network for a pause message inviting new stations to join the network, sending a reply to the pause message, receiving a designation of a Parent Station in a cluster and at least part of an Authorization To Transmit Sequence (ATTS) which specifies the order in which the stations may transmit, the ATTS listing a first station, at least one intermediate station, and a last station, the at least part including stations in the cluster, determining propagation times between the joining station and at least some of the stations in that cluster which are listed in the at least part of the ATTS, determining a position in the at least part of the ATTS where the joining station should be placed with respect to the stations in that cluster so as to maintain network efficiency, defining a revised at least part of the ATTS listing the joining station in that position, receiving a message authorizing the joining station to transmit, transmitting a message, the message including the revised at least part of the ATTS, and transmitting further messages in accordance with the at least part of the revised ATTS.

In this method an option is to receive a local ATTS, the local ATTS being included within the ATTS.

In this method another option is to determine a plurality of network propagation times, each network propagation time being for a different ordering of transmissions for the at least part of the ATTS and including the joining station, and being based upon propagation times between the joining station and at least some of the stations in that cluster which are listed in the at least part of the ATTS, determine the minimum propagation time of the plurality of network propagation times, and provide the ordering of transmissions which resulted in the minimum propagation time as a revised at least part of the ATTS.

A network has a plurality of stations, each station being capable of transmitting and receiving. Each station preferably has a transmitter to transmit messages, a receiver to receive messages, a controller functionally connected to the transmitter to control the transmitter, functionally connected to the receiver to process messages received by the receiver, and also has a memory to store and retrieve an Authorization To Transmit Sequence (ATTS) which specifies an order in which the stations may transmit, the ATTS listing a first station of the plurality of stations, at least one intermediate station of the plurality of stations, and a last station of the plurality of stations, the controller being responsive to the ATTS and to a reverse ATTS, the controller of the first station causes the transmitter of the first station to transmit a first message if the ATTS is in effect, and the controller inspects a received message and causes the transmitter of the first station to transmit a second message if the reverse ATTS is in effect and the received message was transmitted by an immediately preceding station in the reverse ATTS, the controller of each intermediate station inspects a received message and causes the transmitter of the intermediate station to transmit a message if the ATTS is in effect and the received message was transmitted by an immediately preceding station in the ATTS, and causes the transmitter of the intermediate station to transmit a message if the reverse ATTS is in effect and the received message was transmitted by an immediately preceding station in the reverse ATTS, and the controller of the last station inspects a received message and causes the transmitter of the last station to transmit a first message if the ATTS is in effect and the received message was transmitted by an immediately preceding station in the ATTS, and causes the transmitter of the then to transmit a second message, whereby a sequence of transmission of the stations is for the first station listed in the ATTS to transmit, each intermediate station to transmit in its order of listing in the ATTS, the last station listed in the ATTS to transmit, the last station to transmit again, each intermediate station to transmit in its order of listing in the reverse ATTS, and the first station to transmit again; and whereby the sequence of transmissions is executed at least one more time.

In this network, one option is for a controller to implement a reverse ATTS by reversing the order in the ATTS.

In this network, another option is for a controller to also cause the transmitter to transmit a message if the ATTS is in effect and a message was not timely received from an immediately preceding station in the ATTS, or to cause the transmitter to transmit a message if the reverse ATTS is in effect and a message was timely received from an immediately preceding station in the reverse ATTS.

In this network, another option is for a station to have a station interface, and the controller to be in the station interface.

A station for use with a network having a plurality of stations is also described, each station being capable of transmitting and receiving. A station has a transmitter to transmit messages, a receiver to receive messages, and a controller functionally connected to the transmitter to control the transmitter, functionally connected to the receiver to process messages received by the receiver, and having a memory to store and retrieve an Authorization To Transmit Sequence (ATTS) which specifies when the station may transmit with respect to other stations listed in the ATTS, the ATTS listing a plurality of stations, the plurality of stations having a first station, at least one intermediate station, and a last station, the controller being responsive to the ATTS and to a reverse ATTS to cause the transmitter to transmit, the controller inspecting a received message and causing the transmitter to transmit a message if the ATTS is in effect and the received message was transmitted by an immediately preceding station in the ATTS, or causing the transmitter to transmit a message if the reverse ATTS is in effect and the received message was transmitted by an immediately preceding station in the reverse ATTS.

Optionally, a controller may implement a reverse ATTS by reversing the order in the ATTS.

Also optionally, the controller may also cause the transmitter to transmit a message if the ATTS is in effect and a message was not timely received from an immediately preceding station in the ATTS, or cause the transmitter to transmit a message if the reverse ATTS is in effect and a message was timely received from an immediately preceding station in the reverse ATTS.

Also optionally, if a station is the first station in the ATTS, the controller of the first station causes the transmitter of the first station to transmit a first message if the ATTS is in effect, and the controller inspects a received message and causes the transmitter of the first station to transmit a second message if the reverse ATTS is in effect and the received message was transmitted by an immediately preceding station in the reverse ATTS.

Also optionally, if a station is the last station in the ATTS, the controller of the last station inspects a received message and causes the transmitter of the last station to transmit a first message if the ATTS is in effect and the received message was transmitted by an immediately preceding station in the ATTS, and then to transmit a second message.

Also optionally, a station may have a station interface, and the controller may be in the station interface.

The present invention provides for networks that is are self-organizing.

The present invention provides for networks that is are self-managed.

The present invention provides for a network in which each device has a number of opportunities, including, but not limited to, an equal number of opportunities to transmit over a complete Authority To Transmit Sequence cycle.

The present invention provides for a network in which collision detection and avoidance schemes are not required.

The present invention provides for a network in which stations can join the network or drop out of the network without disruption network operations.

These different benefits provided by the present invention may be used individually or in combination with one, some or even all of the other benefits.

Further features and advantages of the invention will be apparent from the Drawing and the description below.

BRIEF DESCRIPTION OF THE DRAWING

FIG. 5A illustrates an exemplary branched network.

FIGS. 5B-5G illustrate the operation of an MPT ATTS as transmitted, received and processed by Station Interfaces and also illustrate the timing of a normal IDM Message Cycle across the network.

FIG. 6 illustrates some examples of transmission media.

FIGS. 7A and 7B illustrate propagation times and propagation time equalities used in connection with the descriptions concerning the network.

DETAILED DESCRIPTION

Figure 1:
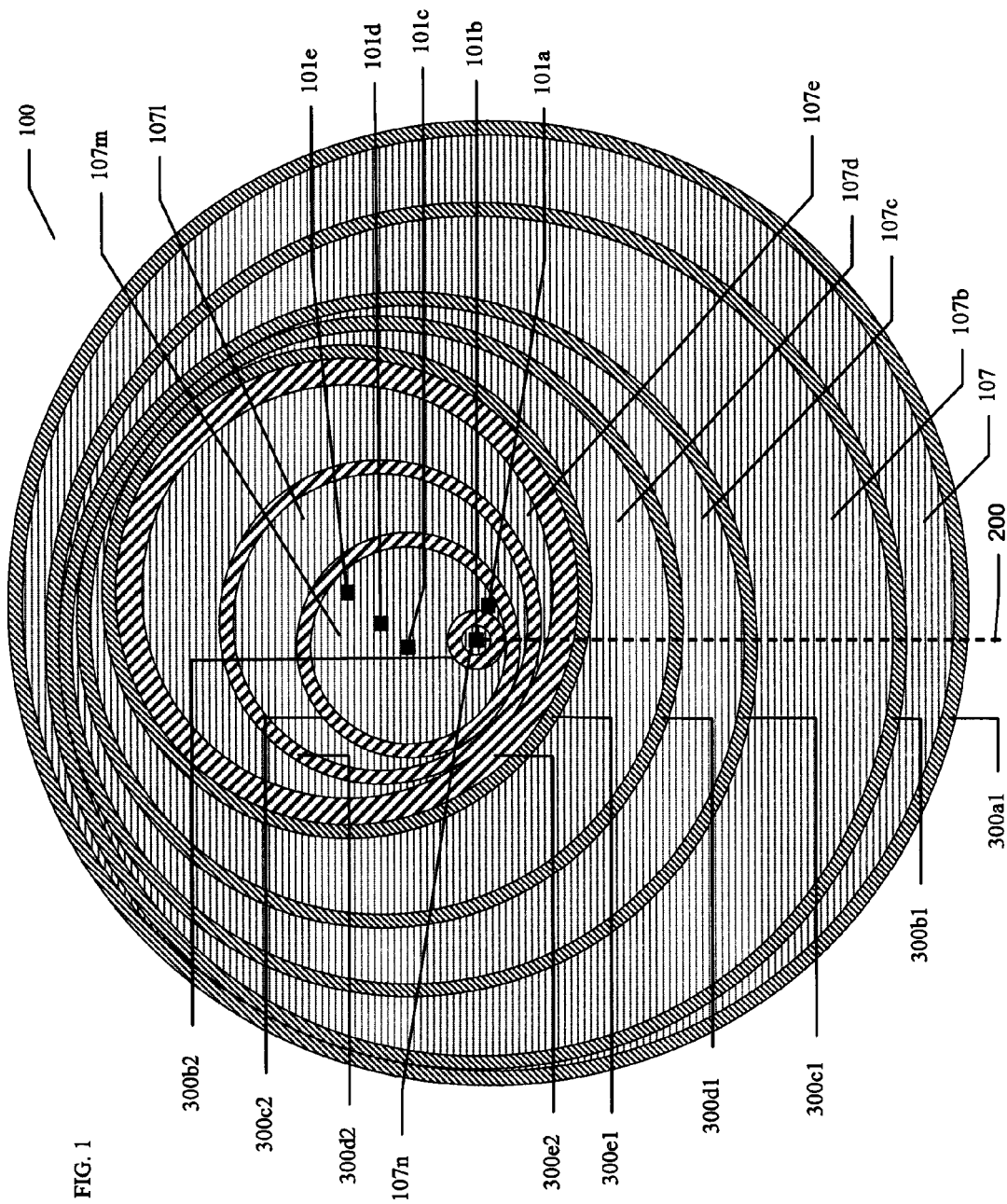
FIG. 1 illustrates a planar cross-section projection of the behavior of a five Station BSTTS network transmitting in 3-dimensional free space.

Turn now to the several Figures of the Drawing in which reference is made in detail to various embodiments of the present invention. The preferred environment of the present invention is a collection of fixed and/or mobile stations forming one or more transmission networks. Any available and appropriate transmission media, singularly or in combination, without regard to media boundaries, may be used. Some non-limiting examples of transmission media, which may be used, are shown in FIG. 6.

For convenience of discussion, certain abbreviations are used herein, as shown in Table 1 below.

TABLE 1

ABBREVIATIONS

| ABBREVIATION | MEANING |
| --- | --- |
| ATTS | Authority To Transmit Sequence |
| BOS | Beginning of Sequence |
| BSTTS | Branched Space-Time Transmission System(s) |
| CD | Collision Detection |
| CDM | Code Division Multiplexing |
| CDMA | Code Division Multiple Access |
| CSMA | Carrier Sense Multiple Access |
| EBM | Ending Bus Master |
| EOS | End of Sequence |
| FDM | Frequency Division Multiplexing |
| FDMA | Frequency Division Multiple Access |
| FOBWDM | Fiber Optic Bus Wavelength Division Multiplexing |
| ID | IDentification |
| IDM | Information Division Management; |
| IDMA | Information Division Multiple Access |
| IEEE | Institute of Electrical and Electronics Engineers |
| LLC | Limited Liability Company |
| MIL | MILitary (United States of America) |
| MPT | Minimum Propagation Time |
| MST | Minimal Spanning Tree |
| OFDM | Orthogonal Frequency Division Multiplexing |
| OFDMA | Orthogonal Frequency Division Multiple Access |
| PT | Propagation Time |
| SBM | Starting Bus Master |
| STD | STandarD |
| TDM | Time Division Multiplexing |
| TDMA | Time Division Multiple Access |
| TSP | Traveling Salesperson Problem |
| US | United States |

The BSTTS station interface methods and devices described herein construct, optimize, and self-manage the flow of information between the stations and transmission media, including, but is not limited to, the organization, control, and optimization of the flow of information through communications media. Hereinafter a BSTTS Station Interface is referred to as "Station Interface".

A BSTTS network consists of one or more stations, including their Station Interfaces, connected in one or more network topologies, and interfaced to any appropriate and available transmission media. Preferably, each active Station Interface holds an identical copy of an ordered set of transmitter identities, the ATTS, which specifies the progression in which Station Interfaces are permitted to transmit. Station transmitters do not transmit at times and/or at frequencies other than those times and those frequencies specified by the ATTS, thereby eliminating collisions and the need for arbitration.

Among other things, the ATTS provides order and prevents collisions when a plurality of Station Interfaces use the same communications technology and might otherwise interfere with each other's communications. Different ATTS may exist for different media. For example, there may be one ATTS for wired communications, another ATTS for low frequency communications, another ATTS for high frequency communications, still another ATTS for acoustic communications, etc. Further, a Station Interface may operate under more than one ATTS. For example, the Station Interface may use one ATTS for performing low frequency communications, another ATTS for performing high frequency communications, and still another ATTS for performing acoustic communications.

A beginning station on the ATTS, which is not necessarily the first station of the ATTS ordered set, initiates a message transmission cycle by sending its data message. The remaining stations then transmit their messages in the order specified by the ATTS. Preferably, the beginning Station Interface of the ATTS awaits the arrival of the data from the last Station Interface defined by the ATTS. When its turn to transmit arrives the last station could, for example, send its message and, when that message reached the beginning station, the process would begin again starting with the first station. In the preferred embodiment, however, rather than wasting the bandwidth waiting for that message to travel from the last station back to the beginning station, a second, reverse ATTS message set is initiated. Thus, after transmitting its message, which can include a payload, for the forward ATTS sequence, the last Station Interface immediately reverses the ATTS and sends a second message, which can also carry a payload. When the authority to transmit, as specified by the reverse ATTS, reaches the beginning station, the transmit ATTS is again reversed. One of these transmission sequences in which each station has two opportunities to transmit is considered to be an "IDM Message Cycle." If a Station Interface does not have a data packet ready to send when it is that Station Interface's turn to transmit, then that Station Interface transmits a status message instead of payload data. This maintains the ATTS integrity and also allows that Station Interface to report its current statistics and/or to indicate its continued presence on the network.

During normal operation, data traffic is maintained entirely by the flow of data or status information between Station Interfaces in the ATTS prescribed order, without the need for Master controllers and/or timing reference signals and/or frequency reference signals. No special control Station Interface, and/or arbitration Station Interface, and/or Master Station Interface is required. When a Station Interface receives a message it checks for the origin of the message. If the message came from the Station Interface which is its immediate predecessor on the ATTS, then it is that Station Interface's turn to transmit as soon as the incoming message has been competed.

The methods and devices disclosed herein can be used on a variety of different networks, composed of the same and/or different transmission media, and are preferably, but not necessarily, implemented using free space transmission. However, omnidirectional and segmented branched networks are possible and contemplated. For example, but not limited to, with an omnidirectional network the messages from each Station Interface are routed in all directions over the network so that each message can be received, where permitted, at every Station Interface. The speed with which each Station Interface receives a message is limited only by the respective propagation delay through the transmission media from the transmitting Station Interface. As mentioned herein, the order in which Station Interfaces have the authority to transmit preferably progresses in one direction at a time along the ATTS, connecting all active Station Interfaces forming that segment of the network. The directions or order in which the ATTS progresses between the Station Interfaces should not be confused with the directional nature in which the messages travel in the communications media and which are limited by physical constraints of the network connections and the network environment.

FIG. 1 illustrates a snapshot planar cross-section of an exemplary BSTTS network 100 embodiment among stations broadcasting in 3-dimensional free space. Initial studies have shown that embodiments of the present invention can use much, possibly up to 99%, of the theoretical bandwidth available to network users, with latencies being a small fraction of those inherent in even the most expensive switched networks.

Only five mobile stations 101 (101a, 101b, 101c, 101d and 101e) are shown for simplicity. Many additional fixed and/or mobile workstations are easily connected to network 100 without loss of generality or functionality. The environment is not limited to the omnidirectional transmission pattern presented by FIG. 1 nor to equal directional energy transmission patterns.

For the free space network 100 it is possible to compute all the possible transmission sequences combinations (5!=120) in order to determine the MPT ATTS, which is given by $MPT_{100} = t_{AB} + t_{BC} + t_{CD} + t_{DE} + t_{ED} + t_{DC} + t_{CB} + t_{BA}$. For network 100 the ATTS IDM Message Cycle is $MPT_{100}$.

The five stations 101 are shown in the process of executing a normal IDM Message cycle. At the time when one, two or all stations 101 process received messages 300, the reception of the messages 300 may be acknowledged by one, two or all stations 101.

For convenience of explanation, and in order to facilitate understanding, unless otherwise specified, ATTS transmissions are authorized in station alphabetical order: $ATTS_{100}$=<station 101a, station 101b, station 101c, station 101d, station 101e>. In an actual environment, the order might be different, such as 101a, 101d, 101b, 101c, and 101e.

Assume now that station 101a has authority, and begins, to transmit message 300a1. As soon as message 300a1 reaches station 101b, station 101b sends message 300b1. As soon as message 300b1 reaches station 101c, station 101c sends message 300c1. As soon as message 300c1 reaches station 101d, station 101d sends message 300d1. As soon as message 300d1 reaches station 101e, station 101e sends message 300e1. As station 101e is the $ATTS_{100}$ limit, or end point, station 101e immediately sends message 300e2 back toward station 101d. As soon as message 300e2 reaches station 101d, station 101d sends message 300d2. As soon as message 300d2 reaches station 101c, station 101c sends message 300c2. As soon as message 300c2 reaches station 101b, station 101b sends message 300b2. As soon as message 300b2 reaches station 101a, station 101a is ready to send, and sends, message 300a2. This completes a full cycle as each station has transmitted two messages. As station 101a is the $ATTS_{100}$ limit, station 101a sends message 300a3 immediately following message 300a2.

For illustrative purposes only, to show the different transmissions, and not indicate any speed, direction, strength, etc., of any message, station 101a is shown as being at the center of messages 300a1 and 300a2, station 101b is shown as being at the center of messages 300b1 and 300b2, etc.

One may look at FIG. 1 as showing that messages 300a1-300e1 and 300e2-300c2 have now been received by, and propagated beyond, all stations 101, but that message 300b2 has just been transmitted and has not yet reached the closest neighbor station 101a. Thus, a first IDM Message Cycle might be the following: station 101a transmits message 300an; then station 101b transmits message 300bn; then station 101c transmits message 300cn; then station 101n transmits message 300dn; then station 101e transmits message 300$_{en}$; then station 101e transmits message 300$_{em}$; then station 101d transmits message 300$_{dm}$; then station 101c transmits message 300$_{cm}$; then station 101b transmits message 300$_{bm}$; then station 101a transmits message 300$_{am}$; where n is a odd integer (in the example above n is the integer 1) and m=n+1, an even integer (in the example above m is the integer 2). Continuous IDM Message cycles for network 100 repeat $ATTS_{100}$ until one and/or all stations 101 cease to transmit. Note that each station, including the starting and ending stations, has had the opportunity to transmit two times, the same as any other station.

Examining the network 100 state along any transmission radius, with the station of choice at the center, such as, but not limited to, that shown as cross-section 200, it is observed that the bandwidth (measured in this case on a radius from station 101b) is optimally used, being occupied either by data (one or messages 300) or by the propagation time through free space $PT_{100}=107a+107b+107c+107d+107e+107l+107m+107n$ along the $ATTS_{100}$ transmission media route from station 101a-to-station 101b-to-station 101c-to-station 101d-to-station 101e and then back from station 101e-to-station 101d-to-station 101c-to-station 101b-to-station 101a.

Figure 2:
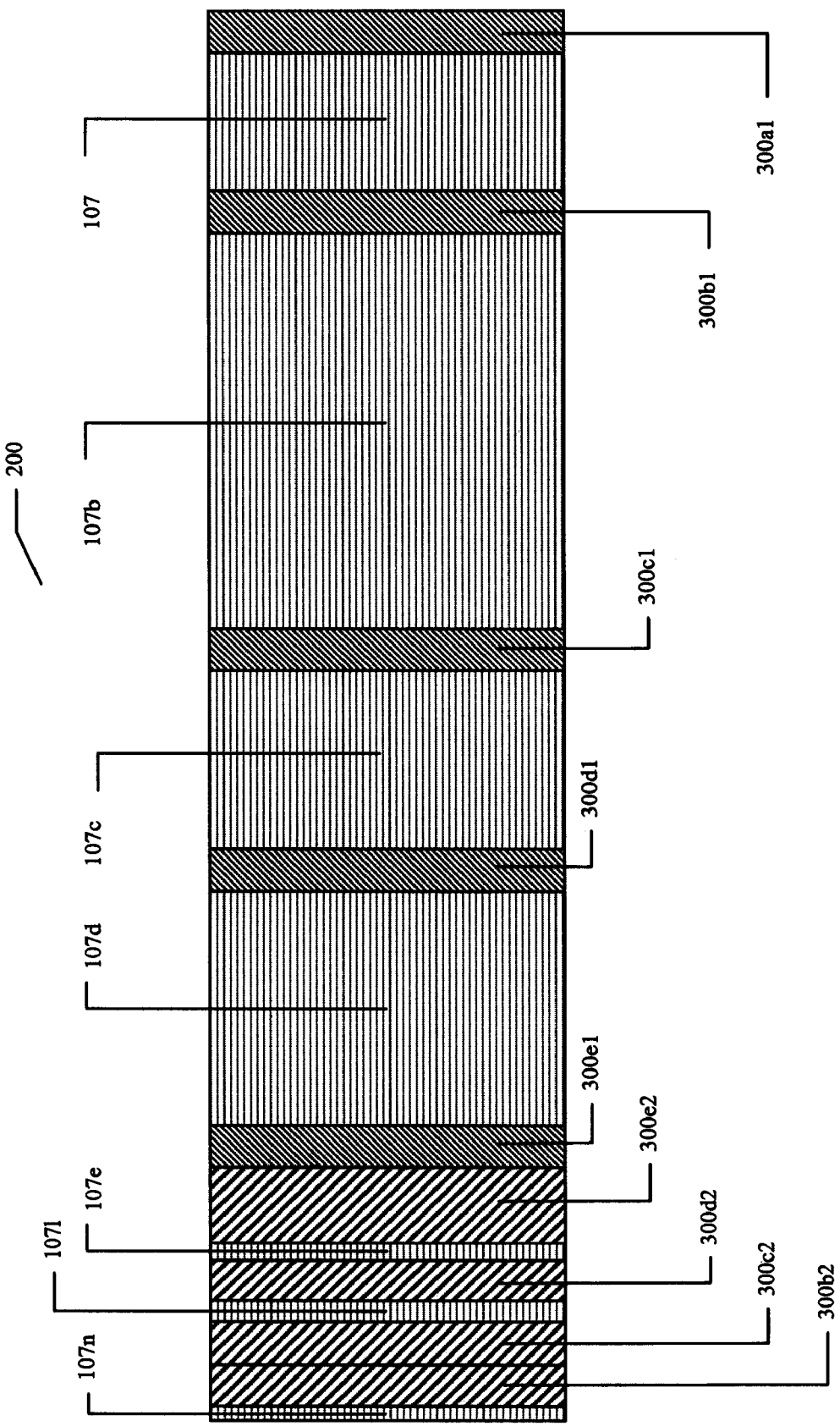
FIG. 2 illustrates the distribution of broadcast energy along a radial transmission cross-section of the planar cross-section projection in FIG. 1.

FIG. 2 illustrates the energy distribution along cross-section 200 with station 101a to the left and the outer edge of message 300a1 to the right. The total propagation time through free space on radial cross-section 200, or any other radial cross-section, adds up to twice the time of the transmission propagation time along the transmission media route from station 101a-to-station 101b-to-station 101c-to-station 101d-to-station 101e.

Figure 3:
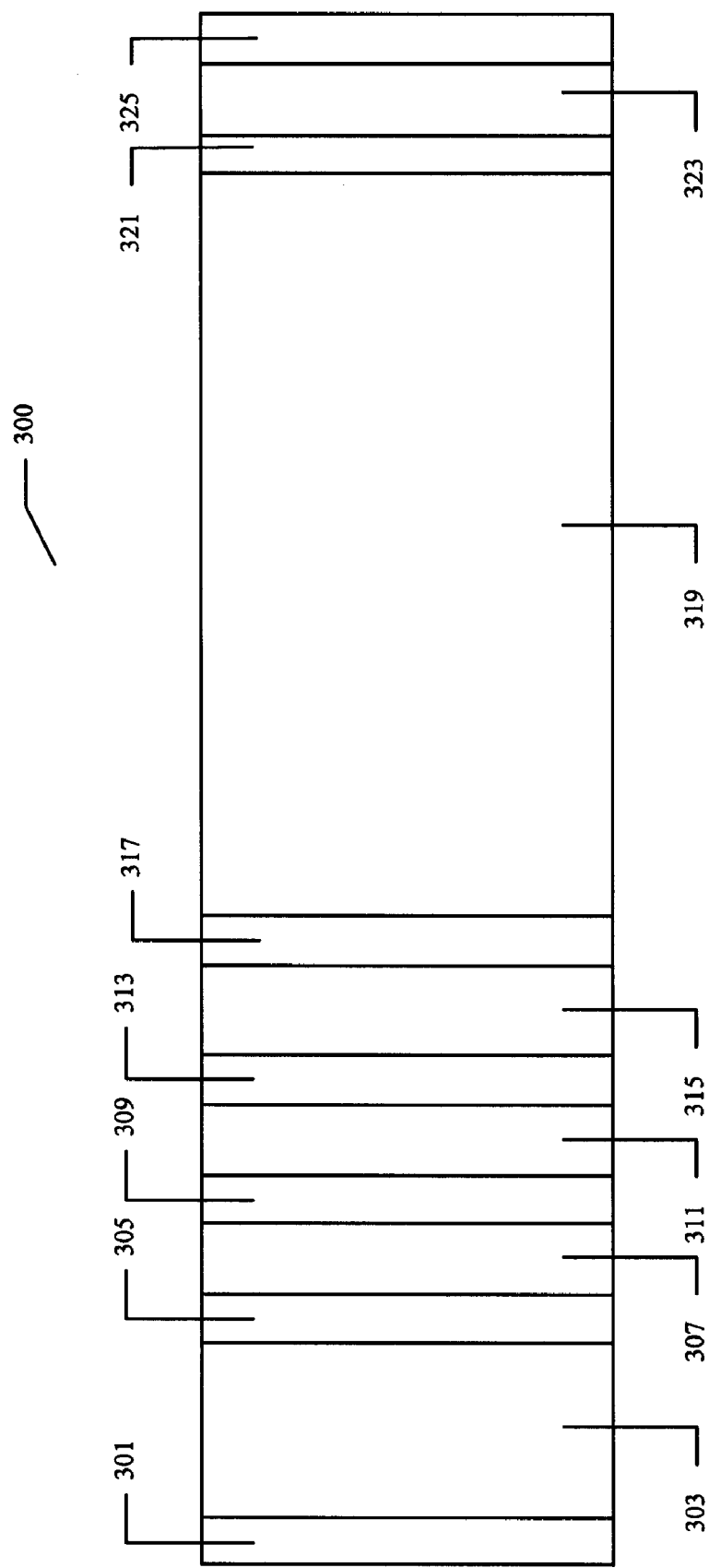
FIG. 3 illustrates a typical BSTTS message as it might appear on a transmission media.

FIG. 3 illustrates a typical BSTTS message 300 as it might appear on a transmission media 600. A BSTTS message 300 may be, and is preferably, formed by adding one or more fields to the standard message packet used by many system embodiments and known to one skilled in the art.

Unlike, for example but not limited to, standard Ethernet where a minimum message length is required for network integrity, a BSTTS network does not require that messages 300 conform to some minimum message length and/or to a fixed message length. Typical of any digital packet network, messages 300 include a header, an information payload, and a trailer. According to the present invention, a station could transmit as long as desired and release the communications media 600 only when it has transmitted everything. In practice, physical and operational constraints may require that the size of the payload of any one message be restricted to some maximum value, and a longer message may be subdivided into shorter messages to meet this maximum message size.

This maximum message size may be determined by the specific environmental criteria, for example, but not limited to: limitations imposed by physical constraints in the Station Interface devices between the station and the transmission media 600; fair access to the transmission media 600 by all stations, bit error rate of the transmission media 600; and Contract Quality of Service.

In one embodiment, when a Station Interface does not have any data from its associated station to transmit for a payload 319, the Station Interface transmits a message 300 whose payload 319 reports the current statistics and status of the Station Interface, thereby releasing unused bandwidth and making the maximum amount of effective bandwidth available to all transmitting stations in the network. In another embodiment the Station Interface transmits a message 300 whose payload 319 reports the changes to its statistics and status. In yet another embodiment the Station Interface transmits a minimum message 300.

The transmission of a status or minimum message 300 provides certain benefits. For example, but not limited to, this keeps wireless, optical and electrical phase lock loops "locked"; it informs all Station Interfaces that the Station Interface and its station are functioning properly even though the Station Interface does not have a payload 319 to send; it permits the health of each Station Interface and station to be easily determined by all Station Interfaces and stations; it informs the next Station Interface in the ATTS of its authority to transmit; it enables dynamic testing of the transmission media 600 physical layer while it is operating, in contrast to other protocols, which must be taken off-line to test the physical layer; and it eliminates the need for separate mechanisms and/or separate bandwidth limiting messages to determine the health of the operating network.

A typical BSTTS message 300 preferably consists primarily of augmented standard packet information, such as, but not limited to: a header, a payload, and a trailer. A header may, for example, include the following fields: start-of-leader 301, leader 303, start-of-routing 305, routing 307, start-of-type 309, message type 311, start-of-time-and-status 313, and time-and-status 315. The start-of-leader 301 and leader 303 fields may be considered to be a preamble. A payload may, for example, include the following fields or message-elements: start-of-payload 317, and user-payload 319. A trailer may, for example, include the following fields or message elements: start-of-trailer 321, trailer 323, and end-of-trailer 325.

The preamble permits the Station Interface detecting sensors to synchronize with the frequency and/or phase of a particular message, for example, but not limited to, when clock recovery transmission is employed. The length of the preamble is, for example, but not limited to, a function of the performance of the transmission media and the synchronization mechanism associated with the specific transmission media and can be specified as a system initialization parameter. The start-of-leader 301, in one embodiment, contains zero bits.

The routing information (message-elements: start-of-routing 305 and routing 307) indicates both the local destination(s) and the ultimate destination(s) of the payload. The routing information can be thought of as an address, which identifies, but is not limited to, such information as transmitting device addresses, receiving device addresses, device network segments, device network associations, and device frequencies of operation. The start-of-routing 305 in one embodiment contains zero bits.

The Station Interfaces may use message category (message-elements: start-of-type 309 and message type 311) and timing and status information (message-elements: start-of-time-and-status 313 and time-and-status 315) to organize and to maintain the ATTS. The start-of-type 309 and start-of-time-and-status 313 fields in one embodiment of the present invention contains zero bits.

The message timing and status information (components: start-of-time-and-status 313 and time-and-status 315) provides each Station Interface with the capability to acknowledge the receipt of any and/or all specific messages, thereby enabling assured delivery of information to any station, without extra message traffic and within one IDM Message Cycle. This information may also be used to determine the propagation time.

The start-of-payload 317 indicates that the user information content follows. The start-of-payload may be used to control Station Interface execution. The start-of-payload 317 field in one embodiment of the present invention contains zero bits.

The payload 319 contains the station information for transmission and reception, which may be sized for each individual transmission from zero bits to some implementation-dependent maximum value of bits, and is delivered and received according to the routing information 307.

The trailer permits each Station Interface, which processes BSTTS message 300 structure, to verify the integrity of the header and payload information. The end-of-trailer 325 field may be used to tune the performance of the transmission media. The start-of-trailer 321 and end-of-trailer 325 fields in one embodiment contains zero bits.

The minimum message 300, in one embodiment, consists of the preamble 303 and trailer 323. The BSTTS message 300 control elements (start-of preamble 301, routing 305, start-of-type 309, start-of-time-and-start-of-status 313, start-of-payload 317, start-of-trailer 321, and end-of-trailer 325) contain information that may be used by or to direct a Station Interface to perform serial and/or parallel processing of message 300.

There are numerous instances herein where Station Interfaces transmit or send a message 300 and/or a message 300 propagates throughout the BSTTS network, for example, but not limited to, BSTTS networks: 100, 400, 500, and 800. They are variously referred to herein as "Sends Messages" or "Transmits Message" or "Transmitting Message" but, unless otherwise indicated, generally have the same meaning and effect. For example, the phrase "Transmits Message 300" preferably means that a Station Interface transfers message 300 from its internal storage and couples the message 300 onto one, two or a plurality of transmission media 600. Note that, because ATTS defined Station Interfaces generally do not have the authority to transmit until the detection of message end-of-trailer 325, there are neither collisions nor a need to perform arbitration while message 300 is delivered throughout the network.

One benefit provided is that the duty cycle of the Station Interface transmitters will be lower than in conventional networks because the ATTS specifies the times when the transmitter active elements are energized. In particular, transmission may begin once the end-of-trailer 325 from the predecessor station interface has been received, or when a timeout has occurred without a transmission from the predecessor station interface. This in turn indicates that the Station Interface transmitters may have a higher Mean Time Between Failure, resulting in more cost effective user networks.

Likewise, there are numerous instances herein wherein Station Interfaces receive and process messages 300, which are associated with a start-of-preamble 301. These instances are variously referred to herein as "Receive Message", or "Receive Messages", or "Receives Message", or "Receives Messages, or "Receiving Message" but, unless otherwise indicated, generally have the same meaning and effect. For example, the phrase "Receive Message 300" preferably means that a Station Interface detects a start-of-preamble 301, accepts (inputs) message 300 and performs certain processing, such as, but limited to the following: reading and then resetting its message-arrival-timer; and determining what action to take with respect to the message.

If a Station Interface determines, from received routing element 307, that the payload 319 is addressed to it but the Station Interface does not have the capability to accept the message 300, then Station Interface does not accept the payload 319 and does not acknowledge the receipt of the message 300. This failure to acknowledge receipt indicates, for example, that the sending Station Interface should re-transmit the message 300 during a future IDM Message Cycle. If the message 300 is addressed to the Station Interface, and the Station Interface has the ability to accept the message, then the Station Interface accepts and acknowledges receipt of the message 300. In one preferred embodiment, even if the message 300 is not addressed to it, and/or the Station Interface cannot accept the message, the Station Interface may process the message 300 to measure transmission media 600 quality.

An inability to accept a message may be because, for example, the message buffers in the Station Interface are full and/or the message buffers in the Station are full, or the Station is not in operation at that time.

Other forms of processing may occur, if desired, when transmitting and/or receiving messages. One benefit provided is that message acknowledgement receipts can be formed, transmitted and received within one IDM Message Cycle, rather than, for example, requiring the use of multiple bandwidth limiting messages requiring multiple transmissions and/or separate signaling paths.

Figure 4A:
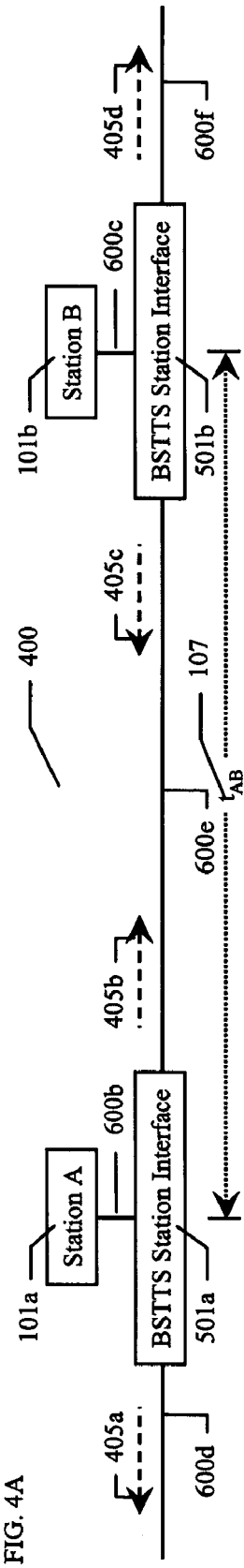
FIG. 4A is a network showing two stations connected via Station Interfaces.

For convenience of explanation, it is preferable to start with reference to a simple network with stations connected using a simple bus. FIG. 4A illustrates a simple network 400 showing station 101a connected via transmission media 600b to Station Interface 501a and station 101b connected via transmission media 600c to Station Interface 501b. Station Interface 501a is connected to Station Interface 501b via transmission media 600e. Station 101a messages transmitted by Station Interface 501a travel simultaneously in both directions: 1) direction 405a along the transmission media 600d and 2) direction 405b along the transmission medium 600e, being detected some propagation time later $t_{AB}$ 107 (FIG. 4A) by the other station 101b Station Interface 501b. Similarly, station 101b messages transmitted by Station Interface 501b travel simultaneously in both directions: 1) direction 405d along transmission media 600f and 2) direction 405d along the shared transmission medium 600e, being detected some propagation time later $t_{AB}$ 107 by the other station 101a Station Interface 501a. This communication may be, for example, half-duplex communication, i.e., two-way communication, one direction at a time via one transmission media 600.

Parallel duplex and multiplex communications, over two or a plurality of transmission media 600 between two or a plurality of Station Interfaces and a two or a plurality of transmission media 600 connected among a plurality of Station Interfaces, using the same and/or different transmission media 600, may also be efficiently organized, controlled, optimized, and operated using the techniques disclosed herein.

For this simple example it is easily possible to compute all the possible combinations (2!=2) of network 400 transmission sequences in order to determine the exact solution that has the MPT for the network 400: MPT=$t_{AB}+t_{BA}=2t_{AB}$. Thus, for network 400 the IDM Message Cycle MPT is $2t_{AB}$.

In FIGS. 4B-4C, and 5A-5G, vertically crosshatched message-elements represent the times when a message 300 is being transmitted by a Station Interface, horizontally crosshatched message-elements represent the propagation times between messages 300, and non-crosshatched message-elements represent the times when Station Interfaces process messages 300.

Figure 4B:
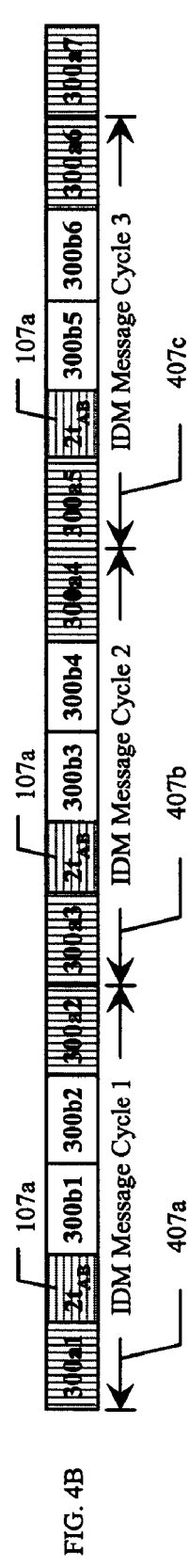
FIGS. 4B and 4C show network events for ATTS IDM message Cycles as detected and processed at different Station Interfaces.
Figure 4C:
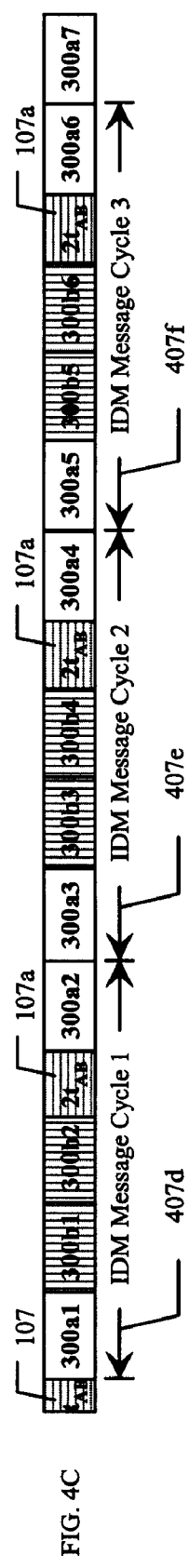

Referring to FIGS. 4A-4C, $ATTS_{400}$ and $ATTS_{401}$ are, in this example, equivalent, exact, and equal ATTS's, with MPT that could control IDM Message Cycles 407 (407a, 407b, 407c, 407d, 407e, and 407f). The ordered set notation $ATTS_{400}$=<Station Interface 501a, Station Interface 501b> means, in this example, that Station Interfaces 501a and 501b are the network end points, and so each get two transmissions in an IDM message cycle, one transmission as the end receiving point, and one transmission as the transmitting starting point. Station Interface 501a will begin the cycle so, with reference to network 400, forward direction transmissions: the first $ATTS_{400}$ defined Station Interface 501a transmits message 300a1; and, after a propagation time delay of $t_{AB}$ 107, Station Interface 501b processes message 300a1, and, because Station Interface 501a is the predecessor of Station Interface 501b, Station Interface 501b transmits message 300b1; thereby completing the first forward direction transmission. "Forward" and "Reverse" refer to the ATTS sequence ordering, not to the physical direction. With reference to network 400, reverse direction transmissions: the last $ATTS_{400}$ defined Station Interface 501b transmits message 300b2 and begins the first reverse direction transmission. Next, after a propagation time delay of $t_{AB}$ 107, Station Interface 501a processes message 300b2. Next, because Station Interface 501b is the predecessor of Station Interface 501a, Station Interface 501a transmits message 300a2, thereby completing the first reverse direction transmission and IDM Message Cycle 407a.

In this example, ATTS$_{401}$=<Station Interface 501b, Station Interface 501a> so, with reference to network 400, Station Interface 501b will begin the cycle. The forward direction transmissions are then: the first ATTS$_{401}$ defined Station Interface 501b transmits message 300b1; and, after a propagation time delay of t$_{AB}$ 107, Station Interface 501a processes message 300b1, and because Station Interface 501b is the predecessor of Station Interface 501a, Station Interface 501a transmits message 300a1 completing the first forward direction transmissions. With reference to network 400, reverse direction transmissions: the last ATTS$_{401}$ defined Station Interface 501a transmits message 300a2; beginning the first reverse direction transmissions. Then, after a propagation time delay of t$_{AB}$ 107, Station Interface 501b processes message 300a2, and, because Station Interface 501a is the predecessor of Station Interface 501b, Station Interface 501b transmits message 300b2; thereby completing the first reverse direction transmissions and also completing the IDM Message Cycle 407d.

FIG. 4B shows network 400 events for ATTS$_{400}$ IDM message Cycles 407a, 407b, and 407c as detected and processed at Station Interface 501a. As defined by ATTS$_{400}$ Station Interface 501a commences IDM message Cycle 1 407a by transmitting message 300a1. Station Interface 501a sets its message-arrival-timer to 2t$_{AB}$ 107a. At an approximate elapsed time interval 2t$_{AB}$ 107a Station Interface 501a receives message 300b1. Next, from its ATTS$_{400}$ copy, Station Interface 501a knows to wait for and to receive message 300b2 for the reverse direction ATTS transmission and then, because Station Interface 501b is Station Interface 501a predecessor, Station Interface 501a transmits message 300a2 completing IDM message Cycle 1 407a. As Station Interface 501a is the first ATTS$_{400}$ defined Station Interface, it then transmits message 300a3, thereby commencing IDM message Cycle 2 407b. Station Interface 501a sets its message-arrival-timer to 2t$_{AB}$ 107a. At an approximate elapsed time interval 2t$_{AB}$ 107a, Station Interface 501a receives message 300b3. Then, from its ATTS$_{400}$ copy, Station Interface 501a knows to wait for and to receive message 300b4 and then, because Station Interface 501b is Station Interface 501a predecessor, Station Interface 501a transmits message 300a4, thereby completing IDM message Cycle 2 407b. As Station Interface 501a is the first ATTS$_{400}$ defined Station Interface, it immediately transmits message 300a5 starting IDM message Cycle 3 407c. Station Interface 501a sets its message-arrival-timer to 2t$_{AB}$ 107a. At an approximate elapsed time interval 2t$_{AB}$ 107a Station Interface 501a receives message 300b5. Next, from its ATTS$_{400}$ copy Station Interface 501a knows to wait for and to receive message 300b6 and then, because Station Interface 501b is Station Interface 501a predecessor, Station Interface 501a transmits message 300a6, thereby completing IDM message Cycle 3 407c. As Station Interface 501a is the first ATTS$_{400}$ defined Station Interface, it immediately transmits message 300a7, thereby commencing the next IDM message Cycle. Station Interface 501a sets its message-arrival-timer to 2t$_{AB}$ 107a and awaits the arrival message 300b7 from Station Interface 501b.

Similarly, FIG. 4C shows network 400 events for ATTS$_{400}$ IDM message Cycles 407d, 407e, and 407f as detected and processed by Station Interface 501b. Initially, Station Interface 501b samples transmission media 600e for a message 300 indicated by the arrival of its start-of-header 301. The time interval t$_{AB}$ 107 Station Interface 501b waits from Station Interface 501a transmission of message 300a1 for its arrival is illustrated at the start of FIG. 4C. Time interval t$_{AB}$ 107 is the time shift between events at the two Station Interfaces 501a and 501b due to media 600e propagation time between them. IDM message Cycle 1 407d commences when Station Interface 501b receives message 300a1 and then, because Station Interface 501a is Station Interface 501b predecessor, Station Interface 501b transmits message 300b1. As Station Interface 501b is the last ATTS$_{400}$ defined station, it then transmits message 300b2. Station Interface 501b sets its message-arrival-timer to 2t$_{AB}$ 107a. At an approximate elapsed time interval 2t$_{AB}$ 107a, Station Interface 501b receives message 300a2. Next, from its ATTS$_{400}$ copy, Station Interface 501b knows to wait for and to receive message 300a3. IDM message Cycle 2 407e begins as Station Interface 501b receives message 300a3 and then, because Station Interface 501a is Station Interface 501b predecessor, Station Interface 501b transmits message 300b3. As the last ATTS$_{400}$ defined Station Interface, Station Interface 501b then transmits message 300b4. Station Interface 501b sets its message-arrival-timer to 2t$_{AB}$ 107a. At an approximate elapsed time interval 2t$_{AB}$ 107a Station Interface 501b receives message 300a4. Next, from its ATTS$_{400}$ copy, Station Interface 501b knows to wait for and to receive message 300a5. IDM message Cycle 2 407f begins as Station Interface 501b receives message 300a5 and then, because Station Interface 501a is Station Interface 501b predecessor, Station Interface 501b transmits message 300b5. As the last ATTS$_{400}$ defined Station Interface, Station Interface 501b then transmits message 300b6. Station Interface 501a sets its message-arrival-timer to 2t$_{AB}$ 107a. At an approximate time 2t$_{AB}$ 107a Station Interface 501b receives message 300a6. This completes IDM message Cycle 3 407f. From its ATTS$_{400}$ copy, Station Interface 501b knows to wait for and to receive message 300a7. Station Interface 501b commences the next IDM message Cycle by beginning to receive message 300a7.

Thus, both FIG. 4B and FIG. 4C illustrate normal ATTS controlled IDM Message Cycles 407 (407a, 407b, 407c, 407d, 407e and 407f) operations between Station Interfaces 501a and 501b to deliver information between the stations 101a and station 101b. As can be seen from FIG. 4B and FIG. 4C, Station Interfaces 501a and 501b exchange two messages each in a total elapsed time consisting of the time each of the four messages 300a1, 300b1, 300b2 and 300a2 are on the transmission media 600e, plus two propagation delays MPT=2t$_{AB}$ 107a. This is a most efficient manner for network 400 to communicate over a shared transmission media 600.

Repetitive transmission at the ATTS limits (network end points) ensures equal access for all stations during each IDM Message Cycle. When that Station Interface is at one of the ATTS ordered set limits it implements buffering of at least two messages 300 and sends the buffered messages 300 back-to-back. Thus, there need be no penalty for a station being at an ATTS ordered set limits.

Subject to transmission media considerations and Station Interface implementation considerations, and except for the obvious physical limitation of the propagation delay among stations, the header, the start-of-payload 317, and the trailer, this implementation enables the bandwidth of the transmission media 600 to be fully utilized by the user payload.

The present invention is not limited to the simple case of FIGS. 4A-4C but also may be applied to, for example, networks that broadcast in free space, networks with larger numbers of stations, networks with one, two and a plurality of branches with larger numbers of stations, networks with one, two or a plurality of interconnecting transmission media 600, and networks composed of mobile and/or fixed stations.

FIGS. 5A-5G illustrate a larger network 500 and the operation thereof. FIG. 5A illustrates an exemplary branched network 500, which is composed of six stations 101 (101a, 101b, 101c, 101d, 101e and 101f). Stations 101 may be of any arbitrary complexity and may be connected via one or more of the same or different transmission media 600 to their Station Interfaces 501a, 501b, 501c, 501d, 501e and 501f. Station Interfaces 501a, 501b, 501c, 501d, 501e and 501f may be connected to transmission media 600a in functional equivalent implementations. Transmission media 600 and 600a may consist of one or more transmission media. In the exemplary embodiment shown, the six stations 101 are shown connected via transmission media to their respective Station Interfaces 501, which are, in turn, interconnected by physical transmission media segments 600a1, 600a2, 600a3, 600a4, 600a5, 600a6, 600a7, and 600a8.

Multiple different BSTTS messages 300 may be simultaneously propagating along different transmission media 600a segments and transmission media 600. Additionally, messages 300 transmitted by Station Interfaces 501a, 501b, 501c, 501d, 501e and 501f within branched network 500 can potentially travel simultaneously in multiple directions along transmission media 600a. For example, but not limited to, messages 300 transmitted by Station Interface 501d within branched network 500 initially travel simultaneously along transmission media segments 600a4 and 600a5, messages 300 transmitted by Station Interface 501c within branched network 500 initially travel simultaneously along transmission media segments 600a3 and 600a4, and messages 300 transmitted by Station Interface 501b within branched network 500 initially travel simultaneously along transmission media segments 600a2, 600a3 and 600a6 Station Interface 501a messages 300a transmitted within branched network 500 initially travel simultaneously along transmission media segments 600a1 and 600a2. Station Interface 501e messages 300e transmitted within branched network 500 initially travel simultaneously along transmission media segments 600a6 and 600a7. Station Interface 501f messages 300f transmitted within branched network 500 initially travel simultaneously along transmission media segments 600a7 and 600a8.

In addition the following energy propagation occurs at Station Interface 501b. Energy propagating along transmission media segment 600a6 to Station Interface 501b is also propagating to Station Interface 501b, to transmission media segment 600a2, and transmission media segment 600a3. Energy propagating along transmission media segment 600a3 to Station Interface 501b is also propagating to Station Interface 501b, to transmission media segment 600a2, and transmission media segment 600a6. Energy propagating along transmission media segment 600a2 to Station Interface 501b is also propagating to Station Interface 501b, to transmission media segment 600a3, and transmission media segment 600a6.

FIGS. 5B-5G illustrate the operation of an MPT ATTS$_{500}$ as transmitted, received and processed by Station Interfaces 501d, 501c, 501b, 501a, 501e and 501f, respectively, and also illustrate the timing of a normal IDM Message Cycle across the simple branched network 500. This illustrates that the lost bandwidth on the transmission media 600a is due to the accumulated propagation delays 107a 107g, 107h, 107j, and 107k among Station Interfaces 501a, 501b, 501c, 501d, 501e and 501f. Thus, the branched network 500 operates at optimum throughput efficiency, because the ATTS$_{500}$ operates with MPT.

The ATTS$_{500}$ transmitted message sequence associated with FIGS. 5B-5G may be described as follows. In this example, the first ATTS$_{500}$ ordered set member, Station Interface 501d commences IDM message Cycles 1 407g, 407h, 407l, 407j, 407k, and 407l by transmitting message 300d1 for one or all other Station Interfaces 501a, 501b, 501c, 501e, and 501f to receive message 300d1. Following propagation time $t_{DC}$ 107l, Station Interface 501c receives message 300d1 from Station Interface 501d. Then, as the next ATTS$_{500}$ ordered set member, Station Interface 501c transmits message 300c1 for one or all other Station Interfaces 501a, 501b, 501d, 501e, and 501f to receive message 300c1. At time $t_{DC}$ 107l+$t_{CB}$ 107m, Station Interface 501b receives messages 300d1 from Station Interface 501d and message 300c1 from Station Interface 501c. As the next ATTS$_{500}$ ordered set member, Station Interface 501b transmits message 300b1, for one or all other Station Interfaces 501a, 501c, 501d, 501e, and 501f to receive message 300b1. At time $t_{DC}$ 107l+$t_{CB}$ 107m+$t_{BA}$ 107n, Station Interface 501a receives message 300d1 from Station Interface 501d, message 300c1 from Station Interface 501c and message 300b1 from Station Interface 501b. As the next ATTS$_{500}$ order set member, Station Interface 501a transmits message 300a1, for one or all other Station Interfaces 501b, 501c, 501d, 501e, and 501f to receive message 300a1. At time $t_{DC}$ 107l+$t_{CB}$ 107m+$t_{BE}$ 107o, Station Interface 501e receives message 300d1 from Station Interface 501d, message 300c1 from Station Interface 501c and message 300b1 from Station Interface 501b, and after propagation delay $2t_{BA}$ 107a, Station Interface 501e receives message 300a1 from Station Interface 501a. As the next ATTS$_{500}$ ordered set member, Station Interface 501e, transmits message 300e1, for one or all other Station Interfaces 501a, 501b, 501c, 501d, and 501f to receive message 300e1. At time $t_{DC}$ 107l+$t_{CB}$ 107m+$t_{BE}$ 107o+$t_{EF}$ 107p, Station Interface 501f receives messages 300d1, 300c1, 300b1, and after propagation delay $2t_{BA}$ 107a, receives messages 300a1 and 300e1. As the next ATTS$_{500}$ ordered set member, Station Interface 501f then transmits message 300f1, for one or all other Station Interfaces 501a, 501b, 501c, 501e, and 501f to receive message 300f1.

In this simple and not limiting example, given that Station Interface 501f is the sixth and last ATTS$_{500}$ defined Station Interface 501f, it immediately reverses the ATTS and transmits message 300f2, for one or all other Station Interfaces 501a, 501b, 501c, 501d, and 501e to receive message 300f2. At a time $t_{FE}$ later, Station Interface 501e receives message 300f1, and as the next ATTS$_{500}$ ordered set member, transmits message 300e2, for one or all other Station Interfaces 501a, 501b, 501c, 501d, and 501f to receive message 300e2. Following propagation time $t_{EB}$+$t_{BA}$ 107n, Station Interface 501a receives message 300e2, and as the next ATTS$_{500}$ ordered set member, transmits message 300a2, for one or all other Station Interfaces 501b, 501c, 501d, 501e, and 501f to receive message 300a2. Following propagation time $t_{AB}$ 107 Station Interface 501b receives message 300a2, and as the next ATTS$_{500}$ ordered set member, transmits message 300b2, for one or all other Station Interfaces 501a, 501b, 501c, 501e, and 501f to receive message 300b2. Following propagation time $t_{BC}$, Station Interface 501c receives message 300a2, and as the next ATTS$_{500}$ ordered set member, transmits message 300c2, for one or all other Station Interfaces 501a, 501b, 501d, 501e, and 501f to receive message 300c2. Following propagation time $t_{CD}$, Station Interface 501d receives message 300c2, and as the next ATTS$_{500}$ ordered set member, transmits message 300d2, for one or all other Station Interfaces 501a, 501b, 501c, 501e, and 501f to receive message 300d2. This transmission completes all IDM message Cycle 1's 407g, 407h, 407l, 407j, 407k, and 407l. In this example, Station Interface 501*d* is the initial ATTS$_{500}$ Station Interface, so it then initiates the next IDM message Cycle by transmitting message 300*d*3.

FIG. 5B illustrates ATTS$_{500}$ IDM message Cycle 1 407*g* as detected and processed by Station Interface 501*d* and is described as follows. At IDM message Cycle commencement, such as, but not limited to, IDM message Cycle 1 407*g*, as the first ATTS$_{500}$ ordered set member, Station Interface 501*d* transmits message 300*d*1, Station Interface 501*d* sets a message-arrival-timer to approximately $2t_{CD}$ 107*g*, and Station Interface 501*d* awaits the next ATTS$_{500}$ message 300*c*1 arrival. After approximate elapsed time interval $2t_{CD}$ 107*g*, Station Interface 501*d* receives message 300*c*1. In the forward ATTS$_{500}$ direction Station Interface 501*d*, is the first ATTS$_{500}$ ordered set member and does not have a predecessor, so Station Interface 501*d* does not transmit, Station Interface 501*d* sets a message-arrival-timer to approximately $2t_{BC}$ 107*h*, and Station Interface 501*d* awaits the next ATTS$_{500}$ message 300*b*1 arrival. After approximate elapsed time interval $2t_{BC}$ 107*h*, Station Interface 501*d* receives message 300*b*1. In the forward ATTS$_{500}$ direction Station Interface 501*d* does not have a predecessor, so Station Interface 501*d* does not transmit, Station Interface 501*d* again sets a message-arrival-timer to approximately $2t_{AB}$ 107*a*, and Station Interface 501*d* awaits the next ATTS$_{500}$ message 300*a*1 arrival. After approximate elapsed time interval $2t_{AB}$ 107*a*, Station Interface 501*d* receives message 300*a*1. In the forward ATTS$_{500}$ direction Station Interface 501*d* does not have a predecessor, so Station Interface 501*d* still does not transmit, Station Interface 501*d* sets a message-arrival-timer to approximately $2t_{BE}$ 107*j*, and Station Interface 501*d* awaits the next ATTS$_{500}$ message 300*e*1 arrival. After approximate elapsed time interval $2t_{BE}$ 107*j*, Station Interface 501*d* receives message 300*e*1. In the forward ATTS$_{500}$ direction Station Interface 501*d* does not have a predecessor, so Station Interface 501*d* does not transmit, Station Interface 501*d* sets a message-arrival-timer to approximately $2t_{EF}$ 107*k*, and Station Interface 501*d* awaits the next ATTS$_{500}$ message 300*f*1 arrival. After approximate elapsed time interval $2t_{EF}$ 107*k*, Station Interface 501*d* receives message 300*f*1, which completes ATTS$_{500}$ forward direction communications.

Station Interface 501*d* determines from its ATTS$_{500}$ copy that Station Interface 501*f* is the last ATTS$_{500}$ ordered set member. Station Interface 501*d* reverses ATTS$_{500}$ direction and Station Interface 501*d* receives messages 300*f*2 and 300*e*2. In the reverse ATTS$_{500}$ direction, message 300*e*2 source Station Interface 501*e* is not Station Interface 501*d*'s predecessor (Station Interface 501*c* is), so Station Interface 501*d* does not transmit, Station Interface 501*d* sets a message-arrival-timer to approximately $2t_{AB}$ 107*a*, and Station Interface 501*d* awaits the next ATTS$_{500}$ message 300*a*2 arrival. After approximate elapsed time interval $2t_{AB}$ 107*a*, Station Interface 501*d* receives messages 300*a*2, 300*b*2, and 300*c*2. In the reverse ATTS$_{500}$ direction, message 300*c*2 is from Station Interface 501*d* predecessor (Station Interface 501*c*), so Station Interface 501*d* transmits message 300*d*2 thereby completing IDM message Cycle 1 407*g* and completing ATTS$_{500}$ reverse direction communications. Station Interface 501*d* is the initial ATTS$_{500}$ member, so Station Interface 501*d* reverses ATTS$_{500}$ to forward direction and Station Interface 501*d* then transmits message 300*d*3 commencing the next IDM message Cycle.

FIG. 5C illustrates ATTS$_{500}$ IDM message Cycle 1 407*h* as detected and processed by Station Interface 501*c* and may be described as follows. At IDM message Cycle commencement, such as, but not limited to, IDM message Cycle 1 407*h*, Station Interface 501*c* is not first ATTS$_{500}$ Station Interface 501*d*, so Station Interface 501*c* samples transmission media 600*a* signals, and awaits the next ATTS$_{500}$ message 300*d*1 arrival. After approximate elapsed time interval $t_{DC}$ 107*l*, Station Interface 501*c* receives message 300*d*1. In the forward ATTS$_{500}$ direction, message 300*d*1 is from Station Interface 501*c*'s ATTS$_{500}$ predecessor (Station Interface 501*d*), so Station Interface 501*c* transmits message 300*c*1, Station Interface 501*c* sets a message-arrival-timer to approximately $2t_{BC}$ 107*h*, and Station Interface 501*c* awaits the next ATTS$_{500}$ message 300*b*1 arrival. After approximate elapsed time interval $2t_{BC}$ 107*h*, Station Interface 501*c* receives message 300*b*1. In the forward ATTS$_{500}$ direction message 300*b*1 source Station Interface 501*b* is not Station Interface 501*c*'s predecessor (Station Interface 501*d*), so Station Interface 501*c* does not transmit, Station Interface 501*c* sets a message-arrival-timer to approximately $2t_{AB}$ 107*a*, and Station Interface 501*c* awaits the next ATTS$_{500}$ message 300*a*1 arrival. After approximate elapsed time interval $2t_{AB}$ 107*a*, Station Interface 501*c* receives message 300*a*1. In the forward ATTS$_{500}$ direction message 300*a*1 source Station Interface 501*a* is not Station Interface 501*c*'s predecessor (Station Interface 501*d*), so Station Interface 501*c* does not transmit, Station Interface 501*c* sets a message-arrival-timer to approximately $2t_{BE}$ 107*j*, and Station Interface 501*c* awaits the next ATTS$_{500}$ message 300*e*1 arrival. After approximate elapsed time interval $2t_{BE}$ 107*j*, Station Interface 501*c* receives message 300*e*1. In the forward ATTS$_{500}$ direction message 300*e*1 source Station Interface 501*e* is not Station Interface 501*c*'s predecessor (Station Interface 501*d*), so Station Interface 501*c* does not transmit, Station Interface 501*c* sets a message-arrival-timer to approximately $2t_{EF}$ 107*k*, and Station Interface 501*c* awaits the next ATTS$_{500}$ message 300*f*1 arrival. After approximate elapsed time interval $2t_{EF}$ 107*k*, Station Interface 501*c* receives message 300*f*1, which completes ATTS$_{500}$ forward direction communications.

Station Interface 501*c* determines from its ATTS$_{500}$ copy that Station Interface 501*f* is the last ATTS$_{500}$ ordered set member. Station Interface 501*c* reverses ATTS$_{500}$ direction and Station Interface 501*c* receives messages 300*f*2 and 300*e*2. In the reverse ATTS$_{500}$ direction, message 300*e*2 source Station Interface 501*e* is not Station Interface 501*c*'s predecessor (Station Interface 501*b*), so Station Interface 501*c* does not transmit, Station Interface 501*c* sets a message-arrival-timer to approximately $2t_{AB}$ 107*a*, and Station Interface 501*c* awaits the next ATTS$_{500}$ message 300*a*2 arrival. After approximate elapsed time interval $2t_{AB}$ 107*a*, Station Interface 501*c* receives messages 300*a*2 and 300*b*2. In the reverse ATTS$_{500}$ direction, message 300*b*2 is from Station Interface 501*c* predecessor (Station Interface 501*b*), so Station Interface 501*c* transmits message 300*c*2, Station Interface 501*c* sets a message-arrival-timer to approximately $2t_{CD}$ 107*g*, and Station Interface 501*c* awaits the next ATTS$_{500}$ message 300*d*2 arrival. After approximate elapsed time interval $2t_{CD}$ 107*g*, Station Interface 501*c* receives message 300*d*2. Since message 300*d*2 is from initial ATTS$_{500}$ defined Station Interface 501*d*, IDM message Cycle 1 407*h* and ATTS$_{500}$ reverse direction communications are complete. Station Interface 501*c* reverses ATTS$_{500}$ to forward direction and receives message 300*d*3 commencing the next IDM message Cycle.

FIG. 5D illustrates IDM message Cycle 1 407*i* ATTS$_{500}$ as detected and processed by Station Interface 501*b* and may be described as follows. At IDM message Cycle commencement, such as, but not limited to, IDM message Cycle 1 407*i*, Station Interface 501*b* is not the first ATTS$_{500}$ Station Interface 501*d*, so Station Interface 501*b* samples transmission media 600*a* signals awaiting ATTS$_{500}$ message 300*d*1 arrival.

After approximate time interval $t_{DC}$ 107*l*+$t_{CB}$ 107*m*, Station Interface 501*b* receives messages 300*d*1 and 300*c*1. In the forward ATTS$_{500}$ direction, message 300*c*1 is from Station Interface 501*b*'s ATTS$_{500}$ predecessor (Station Interface 501*c*), so Station Interface 501*b* transmits message 300*b*1, Station Interface 501*b* sets a message-arrival-timer to approximately 2$t_{AB}$ 107*a*, and Station Interface 501*b* awaits the next ATTS$_{500}$ message 300*a*1 arrival. After approximate elapsed time interval 2$t_{AB}$ 107*a*, Station Interface 501*b* receives message 300*a*1. In the forward ATTS$_{500}$ direction message 300*a*1 source Station Interface 501*a* is not Station Interface 501*b*'s predecessor (Station Interface 501*c*), so Station Interface 501*b* does not transmit, Station Interface 501*b* sets a message-arrival-timer to approximately 2$t_{BE}$ 107*j*, and Station Interface 501*b* awaits the next ATTS$_{500}$ message 300*e*1 arrival. After approximate elapsed time interval 2$t_{BE}$ 107*j*, Station Interface 501*b* receives message 300*e*1. In the forward ATTS$_{500}$ direction message 300*e*1 source Station Interface 501*e* is not Station Interface 501*b*'s predecessor (Station Interface 501*c*), so Station Interface 501*b* does not transmit, Station Interface 501*b* sets a message-arrival-timer to approximately 2$t_{EF}$ 107*k*, and Station Interface 501*b* awaits the next ATTS$_{500}$ message 300*f*1 arrival. After approximate elapsed time interval 2$t_{EF}$ 107*k*, Station Interface 501*b* receives message 300*f*1, which completes ATTS$_{500}$ forward direction communications.

Station Interface 501*b* determines from its ATTS$_{500}$ copy that Station Interface 501*f* is the last ATTS$_{500}$ ordered set member. Station Interface 501*b* reverses ATTS$_{500}$ direction and Station Interface 501*b* receives messages 300*f*2 and 300*e*2. In the reverse ATTS$_{500}$ direction, message 300*e*2 source Station Interface 501*e* is not Station Interface 501*b*'s predecessor (Station Interface 501*a*), so Station Interface 501*b* does not transmit, Station Interface 501*b* sets a message-arrival-timer to approximately 2$t_{AB}$ 107*a*, and Station Interface 501*b* awaits the next ATTS$_{500}$ message 300*a*2 arrival. After approximate elapsed time interval 2$t_{AB}$ 107*a*, Station Interface 501*b* receives message 300*a*2. In the reverse ATTS$_{500}$ direction, message 300*a*2 is from Station Interface 501*b*'s predecessor (Station Interface 501*a*), so Station Interface 501*b* transmits message 300*b*2, Station Interface 501*b* sets a message-arrival-timer to approximately 2$t_{BC}$ 107*h*, and Station Interface 501*b* awaits the next ATTS$_{500}$ message 300*c*2 arrival. After approximate elapsed time interval 2$t_{BC}$ 107*h*, Station Interface 501*b* receives message 300*c*2. In the reverse ATTS$_{500}$ direction, message 300*c*2 source Station Interface 501*c* is not Station Interface 501*b*'s predecessor (Station Interface 501*a*), so Station Interface 501*b* does not transmit, Station Interface 501*b* sets a message-arrival-timer to approximately 2$t_{CD}$ 107*g*, and Station Interface 501*b* awaits the next ATTS$_{500}$ message 300*d*2 arrival. After approximate elapsed time interval 2$t_{CD}$ 107*g*, Station Interface 501*b* receives message 300*d*2. Since message 300*d*2 is from the first ATTS$_{500}$ defined Station Interface 501*d*, IDM message Cycle 1 407*i* and ATTS$_{500}$ reverse direction communications are complete. Station Interface 501*b* reverses ATTS$_{500}$ to forward direction and receives message 300*d*3 commencing the next IDM message Cycle.

FIG. 5E illustrates IDM message Cycle 1 407*j* ATTS$_{500}$ as detected and processed by Station Interface 501*a* and may be described as follows. At IDM message Cycle commencement, such as, but not limited to, IDM message Cycle 1 407*j*, Station Interface 501*a* is not the first ATTS$_{500}$ Station Interface 501*d*, so Station Interface 501*a* samples transmission media 600*a* signals awaiting ATTS$_{500}$ message 300*d*1 arrival. After approximate time interval $t_{DC}$ 107*l*+$t_{CB}$ 107*m*+$t_{BA}$ 107*n*, Station Interface 501*a* receives messages 300*d*1, 300*c*1, and 300*b*1. In the forward ATTS$_{500}$ direction, message 300*b*1 is from Station Interface 501*a*'s ATTS$_{500}$ predecessor (Station Interface 501*b*), so Station Interface 501*a* transmits message 300*a*1, Station Interface 501*a* sets a message-arrival-timer to approximately 2$t_{AB}$ 107*a*+2$t_{BE}$ 107*j*, and Station Interface 501*a* awaits the next ATTS$_{500}$ message 300*e*1 arrival. After approximate elapsed time interval 2$t_{AB}$ 107*a*+2$t_{BE}$ 107*j*, Station Interface 501*a* receives message 300*e*1. In the forward ATTS$_{500}$ direction message 300*e*1 source Station Interface 501*e* is not Station Interface 501*a*'s predecessor (Station Interface 501*b*), so Station Interface 501*a* does not transmit, Station Interface 501*a* sets a message-arrival-timer to approximately 2$t_{EF}$ 107*k*, and Station Interface 501*a* awaits the next ATTS$_{500}$ message 300*f*1 arrival. After approximate elapsed time interval 2$t_{EF}$ 107*k*, Station Interface 501*a* receives message 300*f*1, which completes ATTS$_{500}$ forward direction communications.

Station Interface 501*a* determines from its ATTS$_{500}$ copy that Station Interface 501*f* is the last ATTS$_{500}$ ordered set member. Station Interface 501*a* reverses ATTS$_{500}$ direction and Station Interface 501*a* receives messages 300*f*2 and 300*e*2. In the reverse ATTS$_{500}$ direction, message 300*e*2 is from Station Interface 501*a*'s predecessor (Station Interface 501*e*), so Station Interface 501*a* transmits message 300*a*2, Station Interface 501*a* sets a message-arrival-timer to approximately 2$t_{AB}$ 107*a*, and Station Interface 501*a* awaits the next ATTS$_{500}$ message 300*b*2 arrival. After approximate elapsed time interval 2$t_{AB}$ 107*a*, Station Interface 501*a* receives message 300*b*2. In the reverse ATTS$_{500}$ direction, message 300*b*2 source Station Interface 501*b* is not Station Interface 501*a*'s predecessor (Station Interface 501*e*), so Station Interface 501*a* does not transmit, Station Interface 501*a* sets a message-arrival-timer to approximately 2$t_{BC}$ 107*h*, and Station Interface 501*a* awaits the next ATTS$_{500}$ message 300*c*2 arrival. After approximate elapsed time interval 2$t_{BC}$ 107*h*, Station Interface 501*a* receives message 300*c*2. In the reverse ATTS$_{500}$ direction, message 300*c*2 source Station Interface 501*c* is not Station Interface 501*a*'s predecessor (Station Interface 501*e*), so Station Interface 501*a* does not transmit, Station Interface 501*a* sets a message-arrival-timer to approximately 2$t_{CD}$ 107*g*, and Station Interface 501*a* awaits the next ATTS$_{500}$ message 300*d*2 arrival. After approximate elapsed time interval 2$t_{CD}$ 107*g*, Station Interface 501*a* receives message 300*d*2. Since message 300*d*2 is from the first ATTS$_{500}$ defined Station Interface 501*d*, IDM message Cycle 1 407*j* and ATTS$_{500}$ reverse direction communications are complete. Station Interface 501*a* reverses ATTS$_{500}$ to forward direction and receives message 300*d*3 to commence the next IDM message Cycle.

FIG. 5F illustrates IDM message Cycle 1 407*k* ATTS$_{500}$ as detected and processed by Station Interface 501*e* and may be described as follows. At IDM message Cycle commencement, such as, but not limited to, IDM message Cycle 1 407*k*, Station Interface 501*e* is not the first ATTS$_{500}$ Station Interface 501*d*, so Station Interface 501*e* samples transmission media 600*a* signals awaiting ATTS$_{500}$ message 300*d*1 arrival. After approximate elapsed time interval $t_{DC}$ 107*l*+$t_{CB}$ 107*m*+$t_{BE}$ 107*o*, Station Interface 501*e* receives messages 300*d*1, 300*c*1, and 300*b*1. In the forward ATTS$_{500}$ direction message 300*b*1 source Station Interface 501*b* is not Station Interface 501*e*'s predecessor (Station Interface 501*a*), so Station Interface 501*e* does not transmit, Station Interface 501*e* sets a message-arrival-timer to approximately 2$t_{AB}$ 107*a*, and Station Interface 501*e* awaits the next ATTS$_{500}$ message 300*a*1 arrival. After approximate elapsed time interval 2$t_{AB}$ 107*a*, Station Interface 501*e* receives message 300*a*1. In the forward ATTS$_{500}$ direction, message 300*a*1 is from Station Interface 501e's ATTS$_{500}$ predecessor (Station Interface 501a), so Station Interface 501e transmits message 300e1, Station Interface 501e sets a message-arrival-timer to approximately 2t$_{EF}$ 107k, and Station Interface 501e awaits the next ATTS$_{500}$ message 300f1 arrival. After approximate elapsed time interval 2t$_{EF}$ 107k, Station Interface 501e receives message 300f1, which completes ATTS$_{500}$ forward direction communications.

Station Interface 501e determines from its ATTS$_{500}$ copy that Station Interface 501f is the last ATTS$_{500}$ ordered set member. Station Interface 501e reverses ATTS$_{500}$ direction and Station Interface 501e receives messages 300f2. In the reverse ATTS$_{500}$ direction, message 300f2 is from Station Interface 501e's predecessor (Station Interface 501f), so Station Interface 501e transmits message 300e2, Station Interface 501e sets a message-arrival-timer to approximately 2t$_{AB}$ 107a+2t$_{BE}$ 107j, and Station Interface 501e awaits the next ATTS$_{500}$ message 300a2 arrival. After approximate elapsed time interval 2t$_{AB}$ 107a+2t$_{BE}$ 107j, Station Interface 501e receives messages 300a2 and 300b2. In the reverse ATTS$_{500}$ direction, message 300b2 source Station Interface 501b is not Station Interface 501e's predecessor (Station Interface 501f), so Station Interface 501e does not transmit, Station Interface 501e sets a message-arrival-timer to approximately 2t$_{BC}$ 107h, and Station Interface 501e awaits the next ATTS$_{500}$ message 300c2 arrival. After approximate elapsed time interval 2t$_{BC}$ 107h, Station Interface 501e receives messages message 300c2. In the reverse ATTS$_{500}$ direction, message 300c2 source Station Interface 501c is not Station Interface 501e's predecessor (Station Interface 501f), so Station Interface 501e does not transmit, Station Interface 501e sets a message-arrival-timer to approximately 2t$_{CD}$ 107g, and Station Interface 501e awaits the next ATTS$_{500}$ message 300d2 arrival. After approximate elapsed time interval 2t$_{CD}$ 107g, Station Interface 501e receives messages message 300d2. Since message 300d2 is from the first ATTS$_{500}$ defined Station Interface 501d, IDM message Cycle 1 407k and ATTS$_{500}$ reverse direction communications are complete. Station Interface 501a reverses ATTS$_{500}$ to forward direction and receives message 300d3 commencing the next IDM message Cycle.

FIG. 5G illustrates IDM message Cycle 1 407l ATTS$_{500}$ as detected and processed by Station Interface 501f and may be described as follows. At IDM message Cycle commencement, such as, but not limited to, IDM message Cycle 1 407l, Station Interface 501f is not the first ATTS$_{500}$ Station Interface 501d, so Station Interface 501f samples transmission media 600a signals awaits the next ATTS$_{500}$ message 300d1 arrival. After approximate elapsed time interval t$_{DC}$ 107l+t$_{CB}$ 107m+t$_{BE}$ 107o+t$_{EF}$ 107p, Station Interface 501f receives messages 300d1, 300c1, and 300b1. In the forward ATTS$_{500}$ direction message 300b1 source Station Interface 501b is not Station Interface 501f's predecessor (Station Interface 501e), so Station Interface 501f does not transmit, Station Interface 501f sets a message-arrival-timer to approximately 2t$_{AB}$ 107a, and Station Interface 501f awaits the next ATTS$_{500}$ message 300a1 arrival. After elapsed time interval 2t$_{AB}$ 107a, Station Interface 501f receives messages 300a1 and 300e1. In the forward ATTS$_{500}$ direction, message 300e1 is from Station Interface 501f's ATTS$_{500}$ predecessor (Station Interface 501e), so Station Interface 501f transmits message 300f1, which ATTS$_{500}$ forward direction communications.

Station Interface 501f determines from its ATTS$_{500}$ copy that it is the last ATTS$_{500}$ ordered set member. Station Interface 501f reverses ATTS$_{500}$ direction and Station Interface 501f transmits message 300f2, Station Interface 501f sets a message-arrival-timer to approximately 2t$_{EF}$ 107k, and Station Interface 501f awaits the next ATTS$_{500}$ message 300e2 arrival. After approximate elapsed time interval 2t$_{EF}$ 107k, Station Interface 501f receives message 300e2. In the reverse ATTS$_{500}$ direction, as the last ATTS$_{500}$ ordered set member, Station Interface 501f does not have a predecessor, so Station Interface 501f does not transmit, Station Interface 501f sets a message-arrival-timer to approximately 2t$_{AB}$ 107a+2t$_{BE}$ 107j, and Station Interface 501c awaits the next ATTS$_{500}$ message 300a2 arrival. After elapsed time interval 2t$_{AB}$ 107a+2t$_{BE}$ 107j, Station Interface 501f receives messages 300a2 and 300b2. In the reverse ATTS$_{500}$ direction Station Interface 501f does not have a predecessor, so Station Interface 501f does not transmit, Station Interface 501f sets a message-arrival-timer to approximately 2t$_{BC}$ 107h, and Station Interface 501c awaits the next ATTS$_{500}$ message 300c2 arrival. After elapsed time interval 2t$_{BC}$ 107h, Station Interface 501f receives message 300c2. In the reverse ATTS$_{500}$ direction Station Interface 501f does not have a predecessor, so Station Interface 501f does not transmit, Station Interface 501f sets a message-arrival-timer to approximately 2t$_{BC}$ 107g, and Station Interface 501c awaits the next ATTS$_{500}$ message 300d2 arrival. After elapsed time interval 2t$_{CD}$ 107g, Station Interface 501c receives message 300d2. Since message 300d2 is from initial ATTS$_{500}$ defined Station Interface 501d, IDM message Cycle 1 407l and ATTS$_{500}$ reverse direction communications are complete. Station Interface 501f reverses ATTS$_{500}$ to forward direction and receives message 300d3 commencing the next IDM message Cycle.

As the Station Interface transmits only in accordance with the ATTS, elimination of collisions of signals transmitted by non-collocated transmitters has been achieved. Additionally, elimination of collisions obviates the need for arbitration. Also, any existing device that is involved with collision detection and management and/or arbitration will operate more efficiently and at high throughput when connected to a BSTTS network, because these activities are no longer are required to operate and the bandwidth lost from their operation is available for payload transmission by other stations.

Although use of the ATTS eliminates collisions, to achieve maximum efficiency for any collection of stations that establish communication among members of the collection the ATTS should be computed as an ordered set with MPT. In a simple arrangement of stations, the station order would preferably mimic the order in which an energy transmission would pass each of the stations. For example, referring briefly to FIG. 1, it is readily seen that, if station 101a transmits a message, the energy will propagate outward and pass stations 101b, 101c, 101d and 101e, in turn. Therefore, an ATTS having the sequence 101a, 101d, 101b, 101e, 101c would have significantly longer and cumulative propagation times than an ATTS have the sequence 101a, 101b, 101c, 101d, 101e because the station order is not in the order in which the energy would naturally propagate from one station to the other stations. In practice, however, with more complex station positioning, with stations moving, and/or with branching, this simple analogy might not achieve the optimal results. For example, referring to FIG. 8, the optimal sequence is not immediately apparent. Further, there may be reasons to use a sub-optimal ATTS. For example, a sub-optimal ATTS might be used where the stations are not able to process the data as quickly as it might arrive and therefore need the additional propagation delay in order to process one round of data before another round of data arrives. Another reason is that, as explained herein, the time required to compute the optimal ATTS might be excessive so a sub-optimal, or approximate, ATTS is preferably used to begin communications and then the ATTS is continually and incrementally adjusted to achieve optimum or near-optimum information transmission.

In the examples above, a complete IDM Message Cycle permitting all active stations to exchange data with all other active stations has taken place in the length of time to transmit the messages, plus only the accumulated physical cost of the accumulated transmission propagation delay along the ATTS. The maximum bandwidth utilization can be achieved if and only if the accumulated transmission propagation delay along the ATTS is minimized. Therefore, the ATTS must be realized within the practical constraints of a real network where stations are continually being added and/or removed and/or are in motion. U.S. Pat. No. 4,935,877 to Koza, incorporated herein by reference, teaches that the number of possible alternative transmission order sequences is equal to the factorial of the number of stations (n!). It will therefore be appreciated that it is time prohibitive for even the fastest computers to attempt to solve this problem for the exact minimum propagation time for even a relatively small number of stations. For example, Koza shows that, for only fourteen stations, there are 87,178,291,200 (14!) possible computations needed to determine the optimum transmission order sequence and, for example, if each of the possible routes could be computed at the rate of one transmission order sequence per microsecond, then it would take approximately twenty-four hours to compute all the possible transmission order sequences to determine the minimum propagation time. In most networks this would be an unacceptable delay in starting up, and the joinder, exiting, or failure of even a single station might require restarting the computation process. This is even less acceptable in a network with mobile stations, where stations are typically joining and leaving at a rapid rate. Therefore, an exact determination of the ATTS with MPT for large number of stations is not a practical solution. One embodiment provides for a compromise between determining the exact MPT and the computational time required. This provides an ATTS that is a good approximation to MPT for large numbers of mobile and/or fixed stations.

In one embodiment, for any set of stations which establish communication among members of the set, the approximate ATTS with MPT is computed as an estimate of the TSP solution for all of the stations. The transmission path length as the ATTS connects all the stations is therefore minimized, and the maximum possible bandwidth utilization is approached. To facilitate this computation, during the course of a normal IDM cycle, each Station Interface computes the number of clock intervals that have elapsed since the IDM Message Cycle started, and records that time as part of the message header 313. This enables each Station Interface to compute the propagation time to ATTS members, thereby providing information for non-interfering station addition.

FIGS. 7A and 7B illustrate propagation times and propagation time equalities used in connection with the descriptions concerning network 500. For network 500 all the possible transmission sequence combinations (6!=720) are computed in order to determine the exact ATTS controlled IDM Message Cycle that has the MPT, which is given by
$MPT=t_{DC}+t_{CB}+t_{BA}+t_{AB}+t_{BE}+t_{EF}+t_{FE}+t_{EB}+t_{BA}+t_{AB}+t_{BC}+t_{CD}=2(t_{DC}+t_{CB}+2t_{AB}+t_{BE}+t_{EF})$.

The accumulated propagation time among the ATTS Station Interfaces measures the amount of network bandwidth that cannot readily be recovered or used. Therefore, rapidly computing the ATTS, configuring transmissions in accordance with the ATTS, and operating branched networks in accordance with the ATTS maximizes network throughput. Using another network propagation organization may have a longer propagation time and, therefore, lower throughput.

Configuring and operating customer networks using the ATTS therefore provides the best value for the customer's network capital investment.

However, different ATTS's may give the same results. For example, four different ATTS's, named: $ATTS_{500}$, $ATTS_{501}$, $ATTS_{502}$, and $ATTS_{503}$ could manage network 500 normal IDM Message Cycles 407g, 407h, 407l, 407j, 407k and 407l and provide the same total propagation time MPT routes.

The first equivalent network 500 ATTS is $ATTS_{500}$=<Station Interface 501d, Station Interface 501c, Station Interface 501b, Station Interface 501a, Station Interface 501e, Station Interface 501f> as discussed previously herein.

The second equivalent network 500 ATTS is $ATTS_{501}$=<Station Interface 501d, Station Interface 501c, Station Interface 501a, Station Interface 501b, Station Interface 501e, Station Interface 501f>. From the previous discussions $ATTS_{50}$, forward direction transmissions and reverse direction transmissions may be determined.

The third equivalent network 500 ATTS is $ATTS_{502}$=<Station Interface 501f, Station Interface 501e, Station Interface 501ba, Station Interface 501a, Station Interface 501c, Station Interface 501d>. From the previous discussions $ATTS_{501}$ forward direction transmissions and reverse direction transmissions may be determined.

The fourth equivalent network 500 ATTS is $ATTS_{503}$=<Station Interface 501f, Station Interface 501e, Station Interface 501a, Station Interface 501b, Station Interface 501c, Station Interface 501d>. From the previous discussions $ATTS_{501}$ forward direction transmissions and reverse direction transmissions may be determined.

Figure 8:
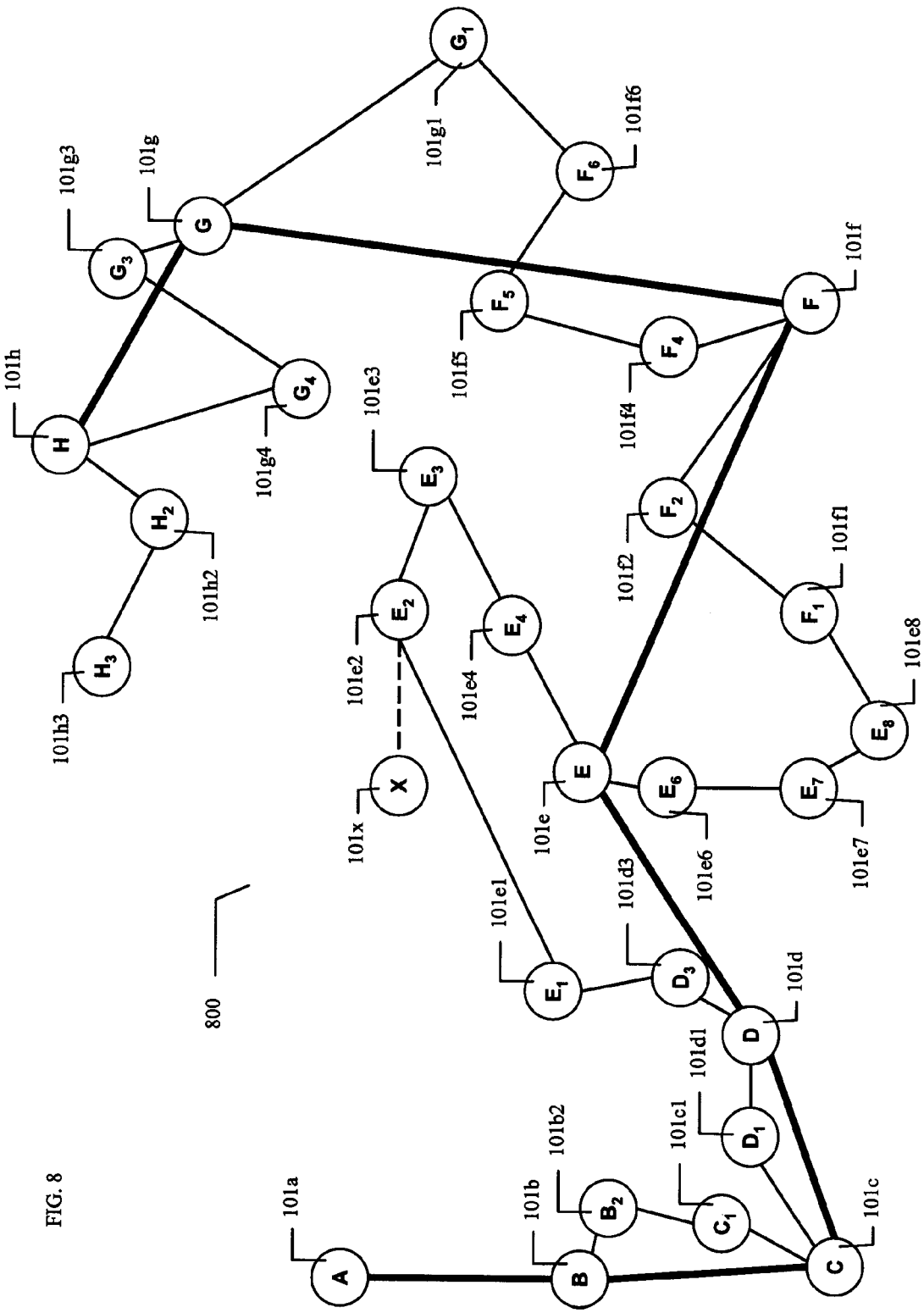
FIG. 8 is an illustration of a larger BSTTS network with a plurality of connected fixed and/or mobile stations and one station requesting to join.

FIG. 8 is an illustration of a larger BSTTS network 800 with a plurality, e.g., twenty-eight, of $ATTS_{800}$ connected fixed and/or mobile stations 101 (101a, 101b, 101b2, 101c, 101c2, 101d, 101d1, 101d3, 101e, 101e1, 101e2, 101e3, 101e4, 101e6, 101e7, 101e8, 101f1, 101f2, 101f4, 101f5, 101f6, 101g, 101g1, 101g3, 101g4, 101h, 101h2, 101h3) and one station 101x requesting to join $ATTS_{800}$. Preferably, the Station Interfaces 501 associated with the stations 101 actually perform the described computations so that station resources are not consumed. Station Interfaces preferably interact with the station to receive information and status from the station, to transmit information and status to the station, and possibly to receive instructions from the station.

In practice, searching all possible ATTS combinations to find the minimum propagation path consumes computation resources in proportion to the factorial of the number (n!) of Station Interfaces involved. For the case of FIG. 8, an exhaustive search of all the possible ATTS combinations requires the calculation and inspection of (28!=304,888,344,611,714,000,000,000,000,000) combinations to determine the $ATTS_{800}$ for network 800. If one $ATTS_{800}$ combination is calculated every picosecond it still would take 96,573,625.8 centuries to compute the $ATTS_{800}$ with MPT, clearly an unacceptable delay. Therefore, in order to achieve an ATTS with an approximate MPT, Station Interfaces are preferably organized hierarchically into clusters of such a size that the exact minimum path across one cluster can be computed in a short amount of time. The computational capability of the Station Interfaces may limit the maximum size of one cluster to a small number of stations (for example, but not limited to, eleven). For this small number of Station Interfaces, the ATTS connects the Station Interfaces with a route or path of MPT. For any larger number of Station Interfaces, piecing together the paths through each cluster develops an approximation to the MPT route. The description of a cluster includes the identity of each member, the order of their appearance within the ATTS, and a vector of the distances between each Station Interface in the cluster.

In one embodiment an estimated $ATTS_{800}$ is determined within a reasonable time, "reasonable" being consistent with the motion of the mobile stations, the estimate being a good approximation to the $ATTS_{800}$ with MPT so as to be BSTTS network operationally useful.

While the ATTS is used to control the transmissions from Station Interfaces connected to BSTTS networks, the Station Interfaces themselves are preferably organized hierarchically in clusters, as shown in FIG. 8. The maximum cluster size may be, for example, but not limited to, eight, or to some other size which allows for computation in a reasonable time commensurate with the computational speed and abilities of the devices. It is possible to perform an exhaustive search of all possible ATTS combinations (8!=40,320) and to compute, for the non-limiting maximum cluster size of eight, the exact $ATTS_{800}$. The maximum cluster size, however, is an implementation detail and is dependent upon the computational capabilities of the Station Interface, and therefore some maximum number of stations in a cluster should preferably be established. In one embodiment a maximum cluster size consistent with the computational capability of the Station Interfaces is used to compute the exact ATTS for that cluster which forms part of the BSTTS network.

In the example shown in FIG. 8 the primary cluster is preferably composed of stations 101a, 101b, 101c 101d, 101e, 101f, 101g, and 101h; chosen merely because these eight stations first joined the operating BSTTS network 800. The primary clusters transmit according to the exemplary $ATTS_{800}$=<station 101a, station 101b, station 101c station 101d, station 101e, station 101f, station 101g, station 101h>. Stations 101b and 101c host sub-clusters, each with one other station. Station 101d's sub-cluster has three stations 101d, 101d1, 101d3. Station 101e's sub-cluster is full with eight stations 101e, 101e1-e4, 101e6-e8. Stations 101f, 101g, and 101h host clusters of six, four and three stations, respectively.

FIG. 8 illustrates the result of generating an exact $ATTS_{800}$ from a hierarchical cluster set. Optimal and exact paths exist for the primary cluster (FIG. 8 heavy line) and for each sub-cluster. For example, the $ATTS_{800}$ is generated starting with the first station (101a in this case) on the primary cluster's $ATTS_{801}$ and traverses that cluster and all sub-clusters to produce the $ATTS_{101a}$=<station 101a>. This is then repeated for the second BSTTS network 800 station 101b to produce $ATTS_{101b}$=<station 101b, station 101b2> and then connects $ATTS_{101b}$ to produce $ATTS_{101ab}$=<station 101a, station 101b, station 101b2>. This is then repeated for the remaining local ATTS's: $ATTS_{101c}$=<station 101c1, station 101c>; $ATTS_{101d}$=<station 101d1, station 101d, station 101d3>; $ATTS_{101e}$=<station 101e1, station 101e2, station 101e3, station 101e4, station 101e, station 101e6, station 101e7, station 101e8>; $ATTS_{101f}$=<station 101f1, station 101f2, station 101f, station 101f4, station 101f5, station 101f6>; $ATTS_{101g}$=<station 101g1, station 101g, station 101g3, station 101g4>; and $ATTS_{101h}$=<station 101h, station 101h2, station 101h3>.

Once the local ATTS's are determined, the process is then repeated to connect the local ATTS's together to form the final $ATTS_{800}$=<station 101a, station 101b, station 101b2, station 101c1, station 101c, station 101d1, station 101d, station 101d3, station 101e1, station 101e2, station 101e3, station 101e4, station 101e, station 101e6, station 101e7, station 101e8, station 101f1, station 101f2, station 101f, station 101f4, station 101f5, station 101f6, station 101g1, station 101g, station 101g3, station 101g4, station 101h, station 101h2, station 101h3>.

When a new Station Interface joins an existing BSTTS network conducting IDM Message Cycle transmissions and receptions the responsibility for computing a new ATTS falls upon the Station Interface attempting to join the operating BSTTS network with minimal interference to the existing IDM Message Cycles of the established operating network. Conventional routers consume payload bandwidth, use up large amounts of memory resources, and expend significant computational resources. In one embodiment, at time intervals established at system initialization, and/or adjustable automatically by the Station Interfaces using feed-forward and/or feed-back control loops and/or by the system administrator, one Station Interface on the ATTS will interrupt the IDM Message Cycle long enough to transmit a special pause message (invitation-to-join message) and then wait for one network propagation diameter (which may be an initialization parameter) for new Station Interfaces to respond. Being a relatively rare event, this joining delay time has almost no effect on the available bandwidth. Contrast the occasional insertion of this joining delay with implementations disclosed in U.S. Pat. No. 5,434,861 to Pritty et al.; and U.S. Published Application US2002/0101874A1 to Whittaker et al., where the delay is imposed at the delivery of every message or message cycle. If a new Station Interface responds with a request to join the BSTTS network, the new Station Interface is provided with the identity of one of the primary cluster nodes, and the joining process by the new Station Interface begins. Otherwise the established ATTS continues operation.

The joining process consists of three stages: finding a cluster with space available, computing a new and optimal ATTS through that cluster including the new station, and assembling the new ATTS.

The first stage is a simple message exchange with one of the ATTS defined Station Interfaces, followed by a process of observing the existing IDM Message Cycle. This first stage is repeated recursively with almost no visible effect on the existing IDM Message Cycles until a cluster is found with space for the new Station Interface.

Once a cluster is found, in the second stage, the Station Interface for the new joining station computes a new, optimal ATTS through that cluster. As a thorough search for the best path through even a small number stations can consume a significant amount of computing time the existing ATTS Station Interfaces are preferably allowed to continue their normal IDM Message Cycles until this computation is complete. When that computation completes, a new cluster configuration is delivered to the members of original cluster.

The third stage is actually a normal data cycle wherein the new Station Interface records the current ATTS, and then the new Station Interface merges into the existing ATTS the path through the new cluster to create an updated ATTS reflecting the presence and position of the new Station Interface. The joining Station Interface broadcasts this new ATTS to all Station Interfaces and the next IDM Message Cycle automatically operates with the new ATTS.

Still referring to FIG. 8, assume now that a new station 101x wishes to join the BSTTS network 800 and therefore observes BSTTS network 800 operations and awaits a pause message. The pause message indicates that it is safe for station 101x to transmit without causing interference with existing message traffic of the operating $ATTS_{800}$ network. This opportunity occurs periodically, at a time interval which may be set, but is not limited to being set, administratively for a specific BSTTS network in one embodiment or, in another embodiment, this time interval is adaptively determined for the BSTTS network. In one embodiment, when the pause interval occurs, one of the defined $ATTS_{800}$ stations, upon receiving authority to transmit, sends a pause message instead of its data message. In another embodiment, all stations know that a pause interval will occur following the current IDM Message Cycle and so they stop transmitting, without any significant loss of bandwidth, to send a pause message instead of a data message. The station sending the pause message could be any of the stations and determined by any desired criteria; for example: the last to send, the next to send, forward direction beginning (or ending) station, reverse direction beginning (or ending) station, etc. For convenience of explanation and illustration, the station sending the pause message is referred to as the Inviting Station. The Inviting Station and all other stations then wait long enough for the pause message to reach the farthest feasible distance to a new station, and to receive an answer back. If there is no answer back, then the IDM Message Cycles continue until it is time for another pause message to be transmitted.

When the new station 101x receives the pause message it immediately responds with a request to join network 800. Station 101x then receives from the Inviting Station a message establishing station 101x's own unique identity on the network 800 and the identity of one station in the primary cluster, herein referred to for convenience as the Parent Station, which may or may not be the same as the Inviting Station. The new station 101x times the round trip time between station 101x and the Inviting Station and records this as the station 101x propagation time to the Inviting Station. This can be easily done because Station 101x knows when it sent the message, the length of the message it sent, and when it received the reply message. Station 101x then sends to the Parent Station a request to join the primary cluster. The Parent Station sends a list of the cluster members and the propagation times between the cluster members. The new station 101x times the round trip time between station 101x and the Parent Station and records this as the station 101x propagation time to the Parent Station. Again, this can be easily done because Station 101x knows when it sent the message, the length of the message it sent, and when it received the reply message. The Parent Station then resumes normal ATTS$_{800}$ IDM Message Cycles. Either the Inviting Station or the Parent Station also sends the current ATTS to the new station 101x. The new station 101x has the current ATTS information so it knows the order in which the various stations are to transmit, and knows the propagation times to the Inviting or Parent Station. The new station 101x then observes one or more ATTS$_{800}$ IDM Message cycles, computing and recording the propagation time to station 101x from each of the cluster member stations. Based upon this information, station 101x selects the closest primary station 101e in the example of FIG. 8.

When a Station Interface joins an operating network, that Station Interface determines the best cluster to join based on being closest in propagation delay to that cluster and that cluster not being fully populated. The Station Interface attempting to join the operating ATTS computes the path of MPT for that cluster, and then integrates the computed path into the existing ATTS to determine the new ATTS. When a Station Interface drops from the network, the Station Interfaces respond to its absence by removing it from the ATTS and continuing to operate. The other members of the dropped Station Interface's cluster also delete the lost Station Interface information from their cluster specification.

After some suitable time interval, which in one embodiment is the next pause interval, the Inviting Station sends a status message to station 101x asking if it is finished and waits for a response from station 101x. In response to this status message request, station 101x may take one of several actions, including, but not limited to, the following.

If the cluster under consideration is not full, station 101x computes a new, optimal path through that cluster, including its own location, and awaits another status request.

If the current cluster under consideration is full, the station 101x declares that the closest station in the current cluster is its new Parent Station, sends that closest station a message requesting its cluster members, and awaits the response from that closest station. Upon receiving that response, station 101x begins analysis of the contents of that cluster. As above, if the cluster under consideration is not full, station 101x computes a new, optimal path through that cluster, including its own location, and awaits another status request.

In either case, the joining station 101x responds to the Inviting Station even if it is busy computing. If any status request message arrives before station 101x computation is finished, station 101x replies with a busy status message. Each of these status request message exchanges occurs between multiples of complete IDM Message cycles with negligible BSTTS network 800 available bandwidth impacts. That is, the stations already in the network do not wait for the new station 101x to complete its calculations but, instead, carry on as if new station 101x does not exist until station 101x has completed its calculations. Thus, only the new station 101x suffers any delay while it is computing propagation delay times and/or the new ATTS.

When station 101x finishes computing the new ATTS through the cluster, it sends that new cluster ATTS to the Parent Station and to the other Station Interfaces in that cluster, and a third stage is entered wherein station 101x integrates the new cluster that includes station 101x's identity with the existing ATTS$_{800}$. The cluster architecture is therefore maintained because the joining Station Interface distributes the cluster information to each and all of its members as it completes the joining process.

For the example network 800 wherein station 101x joins ATTS$_{800}$, the new ATTS is defined to be: ATTS$_{810}$=<station 101a, station 101b, station 101b2, station 101c1, station 101c, station 101d1, station 101d, station 101d3, station 101e1, station 101e2, station 101x, station 101e3, station 101e4, station 101e, station 101e6, station 101e7, station 101e8, station 101f1, station 101f2, station 101f, station 101f4, station 101f5, station 101f6, station 101g1, station 101g, station 101g3, station 101g4 station 101h, station 101h2, station 101h3>.

In one embodiment, when the next status query occurs, for example, at the end of the multiple IDM Message cycle, station 101x broadcasts ATTS$_{810}$ to all stations. All the stations receive ATTS$_{810}$ and the next IDM Message cycle operates using ATTS$_{810}$ instead ATTS$_{800}$.

Station 101x preferably has performed the following computations: analyzed the primary cluster and determined that station role was the closest member, analyzed the cluster hosted by station 101e, found it to be full, and found station 101e2 to be the closest one to station 101x, composed a new cluster hosted by station 101e2 containing station 101e2 and station 101x, ATTS$_{101e2}$=<station 101e2, station 101x>, and composed ATTS$_{810}$.

By placing the measurement and computational burden on the joining Station Interface certain benefits are obtained. While the joining Station Interface is computing the new ATTS, which new ATTS includes the joining Station Interface, the operating BSTTS network Station Interfaces, that is, those which are already part of the network, do not devote resources, such as, but not limited to, buffers, computational effort, and bandwidth to this task. Thus, except the necessary and sufficient initial dialog, there is virtually no interference with the operating BSTTS network's IDM Message Cycles.

The joining Station Interface has the job of measuring distances between Station Interfaces and, as the joining Station Interface is not yet operating as a component of the operating BSTTS network, the joining Station Interface can compute the new ATTS using the computational assets which will eventually be allocated for message management and data storage, thus lowering the cost of the Station Interface while maintaining the speed of the network even as a new Station Interface is joining.

Station Interfaces generally follow the behavior illustrated in FIGS. 9-12. The operation of Station Interfaces is generally illustrated in the state transition diagram of FIG. 9, and the message sequence diagrams of FIGS. 10-12.

Figure 9:
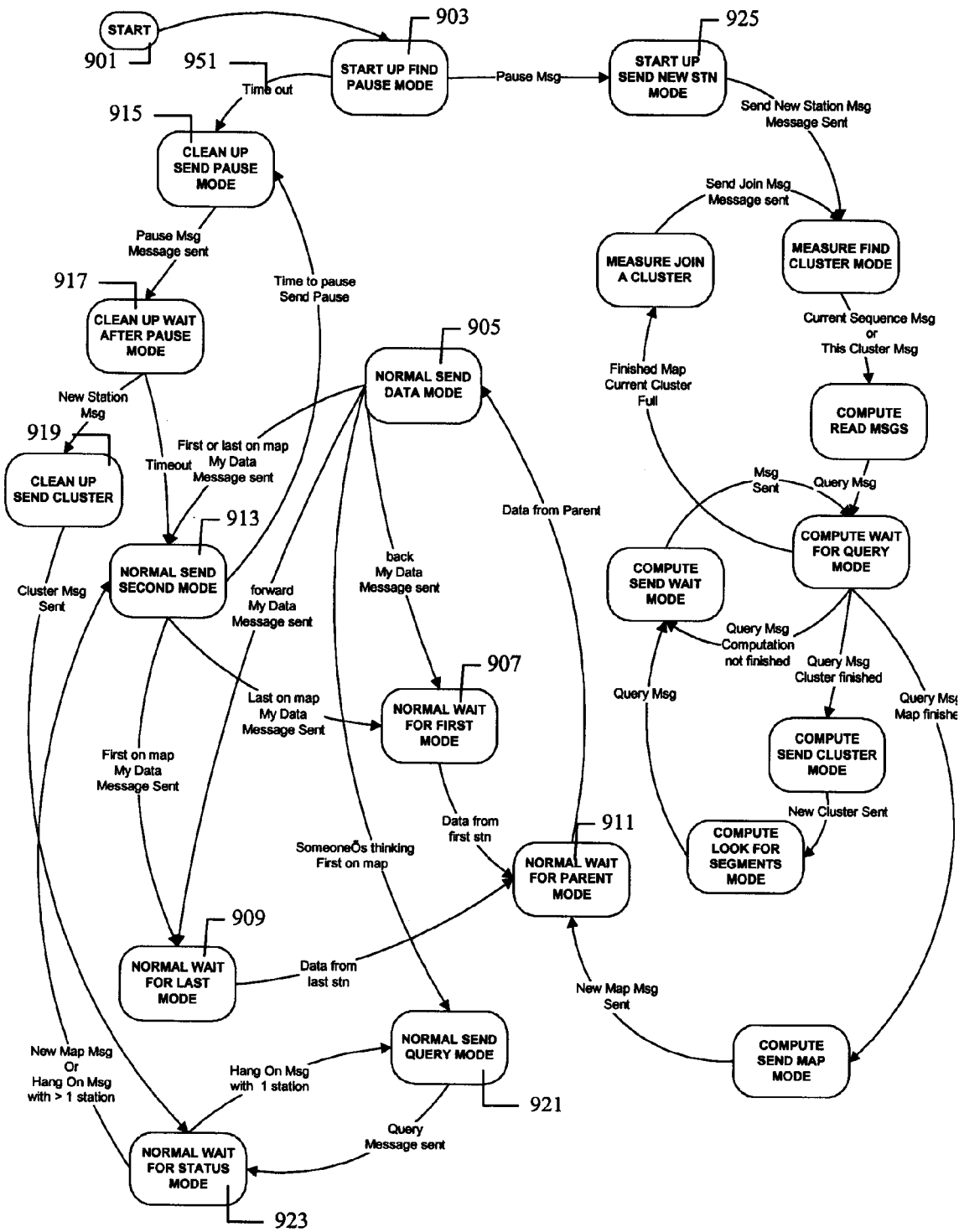
FIG. 9 is an exemplary state transition diagram illustrating the various states of a Station Interface.

FIG. 9 is an exemplary state transition diagram illustrating the various states of a Station Interface and generally shows the various modes or states in which a Station Interface can exist, and identifies the conditions under which the Station Interface will change state. Preferably, these modes or states are executed by all of the Station Interfaces. The state transitions are preferably caused either by the arrival or departure of certain messages or by time elapsing without receiving the expected response. After power up START 901, a Station Interface preferably begins in START_UP_FIND_PAUSE 903 state. The Station Interface then proceeds to either state START_UP_SEND_NEW_STN_MODE 925 as a new station after receiving the Pause message to perform the new station computations, or to state CLEAN_UP_SEND_PAUSE 915 as the original station of a network to host the primary cluster, which may occur, for example, because of a time out condition which indicates there are not any new stations wishing to join.

After either startup sequence, a Station Interface spends the bulk of its time alternating between the central cycles. In the first central cycle, a Station Interface moves from state NORMAL_SEND_DATA_MODE 905 to state NORMAL_WAIT_FOR_FIRST_MODE 907 to state NORMAL_WAIT_FOR_PARENT_MODE 911, and then to state NORMAL_SEND_DATA_MODE 905. In the second central cycle, a Station Interface moves from state NORMAL_SEND_DATA_MODE 905 to state NORMAL_WAIT_FOR_LAST_MODE 909 to state NORMAL_WAIT_FOR_PARENT_MODE 911, and then to state NORMAL_SEND_DATA_MODE 905.

The Station Interfaces that happen to be first and last on the ATTS spend the bulk of their time alternating between the first and second central cycles with the addition of the state NORMAL_SEND_SECOND_MODE 913 as illustrated in FIG. 9.

The Inviting Station uses the following join process: state NORMAL_SEND_DATA_MODE 905 to state NORMAL_SEND_SECOND_MODE 913 to state CLEAN_UP_SEND_PAUSE_MODE 915 to state CLEAN_UP_WAIT_AFTER_PAUSE_MODE 917 to state CLEAN_UP_SEND CLUSTER 919 to state NORMAL_WAIT_FOR_STATUS_MODE 923 to state NORMAL_SEND_QUERY_MODE 921 to state NORMAL_WAIT_FOR_STATUS_MODE 923 to state NORMAL_SEND_SECOND_MODE 913. By this process the Inviting Station Interface has sent a pause message, allowed a time for a reply, sent the cluster and parent information to the new station, and received the new cluster information and ATTS from the new station.

FIG. 9 also illustrates the sequence of states, beginning at state 925, followed by the new station as it computes the new ATTS and broadcasts the new ATTS to all active Station Interfaces, and then joins the normal cycle at NORMAL_WAIT_FOR_PARENT_MODE 911.

Figure 10:
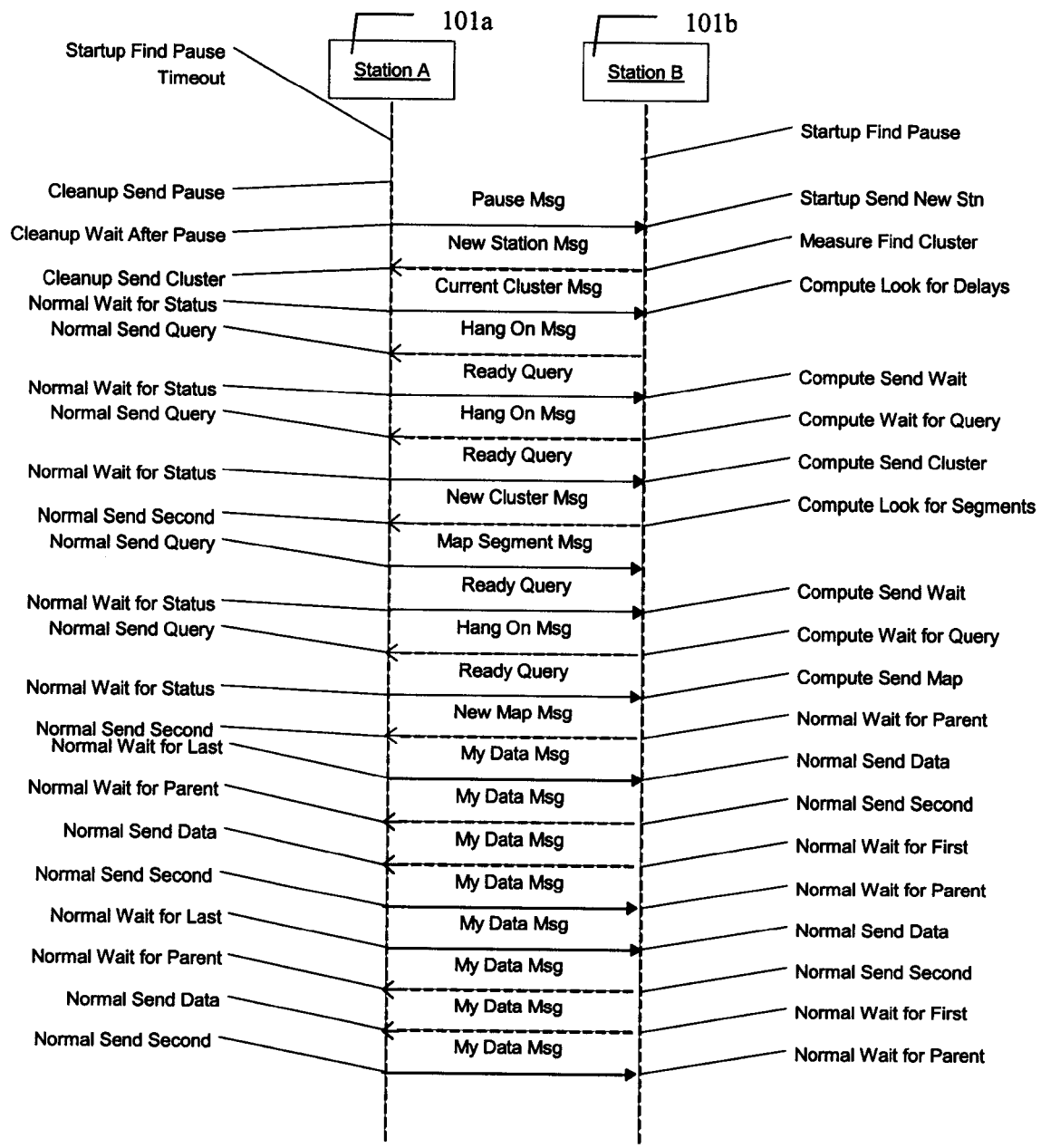
FIGS. 10-12 illustrate the message sequence diagrams for startup and joinder conditions.
Figure 11:
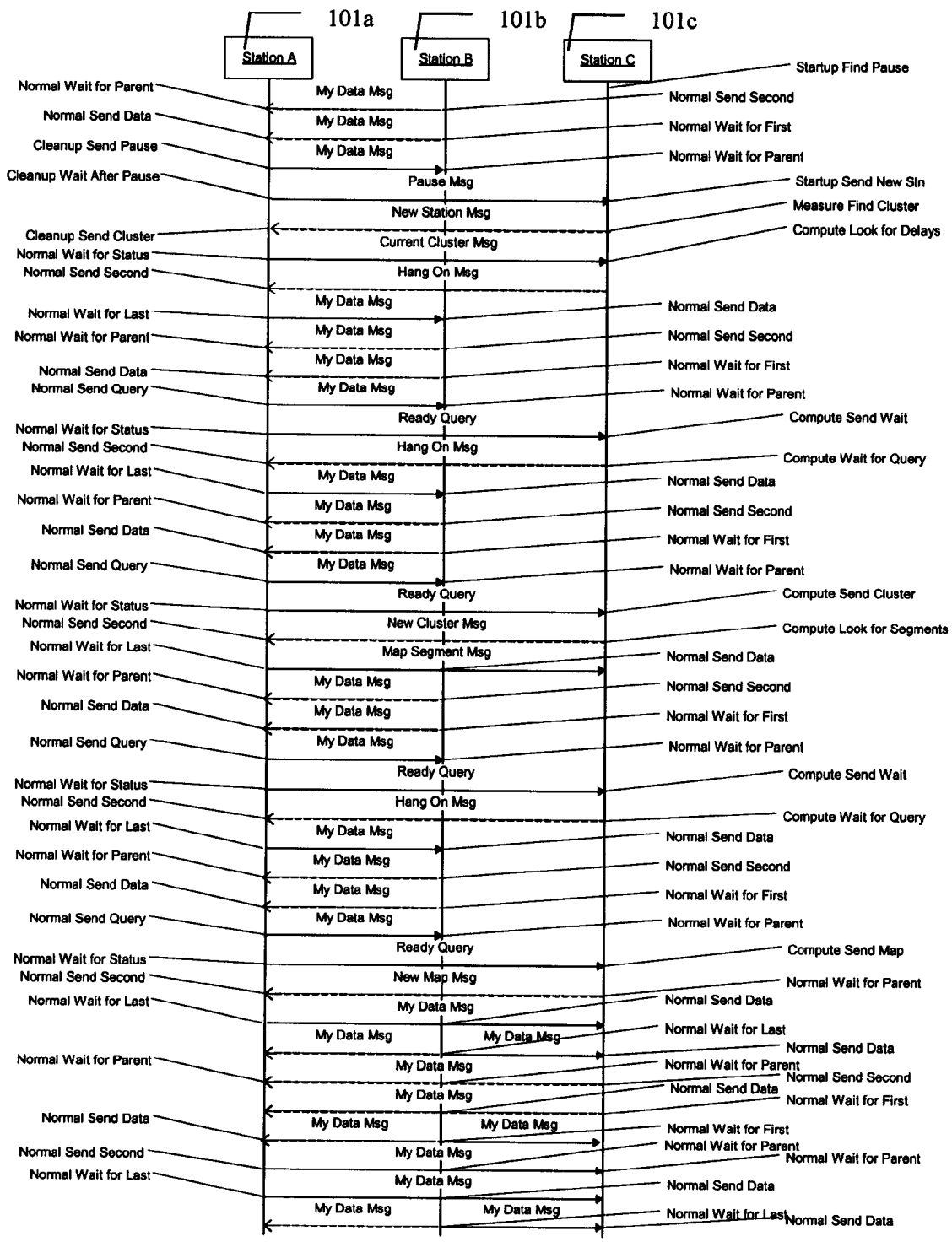
Figure 12:
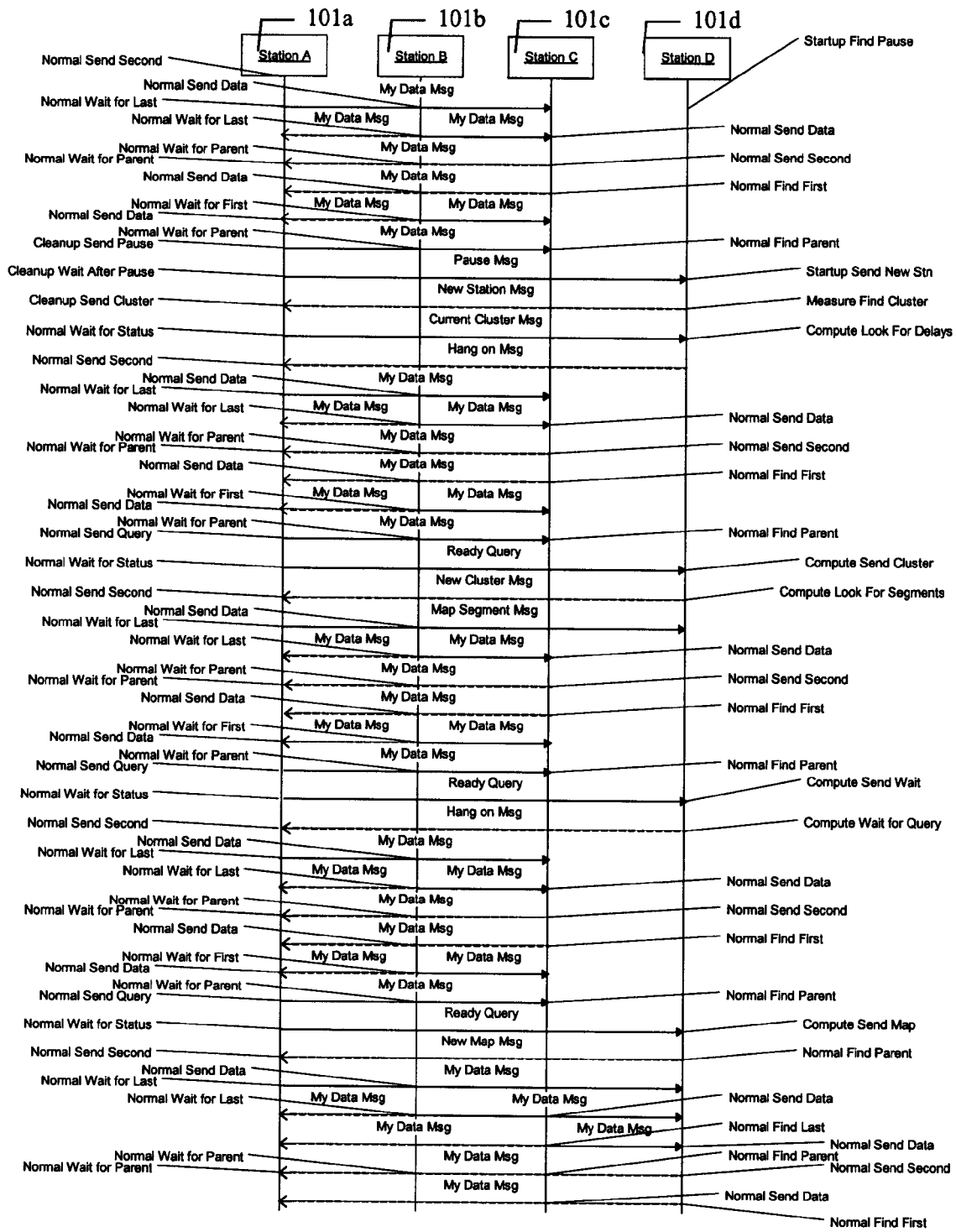

FIGS. 10-12 are message sequence diagrams that show the details of the message flow and the state changes when two, three and four Station Interfaces, respectively form or join a primary cluster. In FIGS. 10-12, the messages and their directions are identified in the center of each figure and the corresponding state transitions are annotated down the margins of each figure.

FIG. 10 shows the details of the message flow and the state changes when two Station Interfaces 101a and 101b form a primary cluster. Station Interface 101a begins by listening for other transmitting Station Interfaces. However, as a cluster has not yet been formed, Station Interface 101a times out and begins sending pause messages. Station Interface 101b starts in the same way, that is, by listening for other transmitting Station Interfaces. Before Station Interface 101b times out, however, Station Interface 101b receives the pause messages from Station Interface 101a. Station Interface 101b therefore begins the dialog with Station Interface 101a to establish IDM Message Cycle communications and form the primary cluster. This simple case illustrates the starting sequence uncluttered by any other message traffic. Note that Station Interface 101b, as the joining Station Interface, has the job of computing delays.

FIG. 11 shows the details of the message flow and the state changes when a third Station Interface 101c wishes to join the primary cluster. In this example it is presumed that Station Interfaces 101a and 101b, and/or some other Station Interfaces, have already formed the primary cluster. Station Interface 101c begins by listening for other transmitting Station Interfaces and detects the traffic from Station Interfaces 101a and 101b. It then, at the appropriate time, joins the operating network. Notice that Station Interface 101c proceeds through the same state transitions, as Station Interface 101b in FIG. 10, and that the original operating BSTTS network, Station Interface 101a and Station Interface 101b, are running the IDM Message Cycles with minor interruption from Station Interface 101c's dialog with Station Interface 101a. Note that Station Interface 101c, as the joining Station Interface, has the job of computing delays and sending the new ATTS.

FIG. 12 shows the details of the message flow and the state changes when a fourth Station Interface 101d wishes to join the primary cluster. In this example it is presumed that Station Interfaces 101a-c, and/or some other Station Interfaces, have already formed the primary cluster. Station Interface 101d begins by listening for other transmitting Station Interfaces and detects the traffic from Station Interfaces 101a-c. It then, at the appropriate time, joins the operating network. Station Interface 101d proceeds through the same state transitions as Station Interface 101b in FIG. 10 and as Station Interface 101c in FIG. 11, and that the original operating BSTTS network, Station Interface 101a, Station Interface 101b and Station Interface 101c, are running IDM Message cycles with minor interruption from Station Interface 101d's dialog with Station Interface 101a. Note that Station Interface 101d, as the joining Station Interface, has the job of computing delays and sending the new ATTS.

A robust and functional network system, especially one involving mobile stations, must allow an active station to be dropped from the network but still leave the network operating normally, and with minimal disruption. Removing a station that drops from the network while maintaining the integrity of the network involves two activities: the ATTS is updated or repaired in order to maintain the flow of messages; and the cluster architecture is updated or repaired to facilitate subsequent station joining.

Each Station Interface preferably separately maintains and updates its copy of the ATTS by continually operating, in one embodiment, at least one timer with two purposes or, in another embodiment, two or more timers. When a message is received from the Station Interface's ATTS predecessor, the value of that timer and the size of the message received are used to compute the accumulated ATTS propagation time since the start of an IDM Message cycle. The Station Interface puts that value into the outgoing message header. The timer is, or the timers are, then reset and begin measuring time again.

If the timer expires before a next message is received from the ATTS defined Station Interface predecessor, that Station Interface predecessor is presumed to have dropped from the network so the Station Interface deletes the ATTS Station Interface predecessor from its local copy of the ATTS and immediately sends its own data or status message. An allowance, of a predetermined amount of time, may be provided, if desired, so that small delays in reception caused by, for example, the stations moving farther apart do not result in the erroneous presumption that a station has dropped out. All the Station Interfaces check which Station Interfaces have transmitted every IDM Message cycle, and remove those Station Interfaces that have not transmitted within the IDM Message cycle from their ATTS. Therefore, the non-transmitting Station Interfaces are removed from all the ATTS copies across the network within the IDM Message cycle. Should the dropped Station Interface subsequently need to rejoin the operating BSTTS network, that Station Interface goes through the normal Station Interface join process. Optionally, at the discretion of the network administrators, a Station Interface may be required to be reset, manually and/or automatically, before it can initiate a rejoining cycle and/or before it will be allowed to rejoin. This reduces adverse effects on the network caused by an erratic device if the problem can be resolved by resetting, e.g., restarting, the device. The cluster architecture preferably is repaired after the loss of a station.

All Station Interfaces, including those that are preparing to join the operating network, monitor operating network traffic and each Station Interface is immediately aware of the loss of any and all stations that drop out of the operating network. The remaining Station Interfaces in a cluster can determine whether one and/or more of their members are missing, and need do nothing when none of their members is missing.

When a member is missing, the following actions occur. If the dropped Station Interface is not the host of another cluster then that Station Interface is simply removed from the cluster. If the dropped Station Interface is the host of another cluster then another member of that cluster must assume the role of hosting that cluster. The best candidate for this role is a member of that cluster which is currently not hosting another cluster, i.e., a "leaf node" on the that cluster. A depth-first search is therefore performed to find a leaf node in that cluster hierarchy, the leaf node is removed from its current cluster, and then the leaf node is installed as the host of the cluster which just lost its host Station Interface. In one embodiment, these actions are performed by the Station Interface to which the dropped Station Interface was the predecessor Station Interface. In another embodiment, a Station Interface which can communicate with another member of that cluster performs the actions.

BSTTS Station Interfaces therefore self-organize and self-manage the ATTS, and can accurately set their message-arrival-timers. The message-arrival-timers permit BSTTS networks to operate more bandwidth efficiently than conventional networks when, for example, a BSTTS Station Interface drops from the BSTTS networks. Also, operating with the self-organizing and self-managing ATTS provides inherent health monitoring of the BSTTS networks without the need for the expenditure of additional network resources.

An operating cluster preferably continually monitors the message traffic with the goal of improving the optimality of the ATTS. This provides for the continued, efficient operation of a network, especially one which contains mobile stations. Returning to the matter of solving the TSP, because of its computational complexity, solutions to the TSP for a significant number of nodes are generated in two stages: an initial estimate of the solution; and a period of analysis attempting to improve the solution by various techniques. In one embodiment, each Station Interface calculates its propagation time to its neighbors, and therefore can easily determine the propagation time to all their neighbors. From these data, it is therefore readily possible to perform a local optimization that will re-order this small group of stations. Preferably, each Station Interface performs these calculations on a continuous basis, or at least at regular intervals. Whenever such an optimized re-ordering is then automatically determined, a new, re-ordered ATTS is distributed to all Station Interfaces when one of the Station Interfaces has the authority to transmit. In one embodiment, this is done when the Station Interface does not have any payload data to send. These calculations could also be done by a station rather than a Station Interface. As before, normal operation of the BSTTS network resumes uninterrupted on the next IDM Message cycle.

The above procedure provides several benefits. First, by refining the quality of the ATTS, the network bandwidth available under normal circumstances is continually improved. The results from the hierarchical cluster TSP solution are most likely to be adversely affected at the transition from one cluster to another, where long paths may be created. By locally analyzing this situation, the Station Interfaces are able to shorten the ATTS propagation time and thereby improve the available bandwidth. Second, bandwidth availability is maintained even when some, or all, of the stations are in motion. Thus, unlike the prior art, the stations operating as disclosed herein can operate at near optimal efficiency even when all the stations are moving in three dimensions in any transmission media 600 that supports digital packet transmission. A problem generally unique to mobile stations, compared to a fixed station, is that the propagation time may increase as the stations move away from the original configuration for which the ATTS was optimized. However, once the initial ATTS has been constructed, this active self-assessment process continually adapts the approximate ATTS to counter the effects of station mobility on the efficiency of bandwidth utilization. In one embodiment, this is performed thousands of times per second, but still has little or no cost in bandwidth during normal IDM Message Cycles.

In the refinement of the ATTS, close approximations to the optimal TSP solution are computed for use to organize and to control networks with a large numbers of stations; propagation time measurements induce minimal to no interference with the operation of the communicating network; network efficiency of the ATTS improves through continual refinements; and collisions are avoided during the joining process.

Communicating among a large number of stations on shared transmission media 600 with the lowest lost network bandwidth requires a computationally practical solution to the TSP. Exact solutions to the TSP are extremely computationally expensive, and can be achieved practically using today's hardware, for example, for less than a dozen stations. Some approximate solutions apply only to linear networks. Others, using the classical approximation referred to as the Minimal Spanning Tree (MST), still require significant amounts of computation and memory, and are guaranteed to achieve a solution only within a factor of 2 of the optimal solution. In particular, the amount of memory consumed by the MST technique grows as $N^2$, and the computational load as grows as $N^3$, where N is the number of stations. These MST characteristics, using today's hardware, make the limiting practical upper bound of this algorithm application to somewhere around 200 stations or less.

In one embodiment, an approximate ATTS is constructed and maintained in real-time and the logic that computes the approximate TSP solution is implemented in two parts: the logic for a Station Interface to join the network and create a new approximate ATTS, and the logic for each Station Interface to contribute to the maintenance of the existing ATTS.

A hierarchical clustering technique is used in one embodiment and can achieve, within 20%, the optimal TSP solution for over 10,000 stations while consuming minimal computation and memory resources. This provides for practical implementation based upon available standard hardware Station Interface implementations. This also results in no computational load placed on the Stations or Station Interfaces already communicating over the established network, provides minimum operating network interference, and provides for minimum communications bandwidth consumption.

BSTTS networks are self-organizing, Self-Managed, and do not require a network administrator in that they can respond to, and recover from, conditions that cause one or more Station Interfaces to lose contact with other Station Interfaces. In one embodiment, all Station Interfaces are compatible in behavior. As mentioned herein, in one technique for computing the approximate ATTS connectivity the Station Interfaces are arranged hierarchically in clusters. As with all hierarchies, there is a root cluster from which the other clusters extend. This root cluster is referred to as the Primary Cluster, which may be of any convenient size that is compatible with current hardware Station Interface computational capabilities. Membership in this Primary Cluster is accomplished merely by being among the first Station Interfaces to join the network. In one embodiment, significant separation from other Station Interfaces may be required and, otherwise, membership in the Primary Cluster is denied by membership in a non-Primary Cluster is provided. This hierarchy is completely Self-Managed. For example, in one embodiment, if one of the Primary Cluster Station Interfaces drops from the network, the next Station Interface to join is added to the Primary Cluster or a Station Interface in a non-Primary Cluster may become a member of the Primary Cluster.

Subsequently, any station joining the BSTTS network finds its location in the hierarchy by first communicating with one of the Primary Cluster Station Interfaces. That Station Interface provides the joining Station Interface with the identity of its cluster members and a table of its distances and/or time from the other members. The logic in the joining Station Interface then computes its distance from each Primary Cluster Station Interface and chooses the closest. As this chosen Station Interface may itself be the host of another cluster, the joining Station Interface sends a message asking to join the cluster of the chosen Station Interface. If space in that cluster is available permission may be granted. If space in that cluster is not available, the process is repeated until a cluster is found which has an available space for the new Station Interface.

The joining Station Interface then adds itself to that cluster and computes the path connecting the Station Interfaces of this cluster, including itself in the cluster. Next, the joining Station Interface, in order to form the new ATTS, determines the proper place to splice into the cluster, deletes all the old nodes in this cluster from the current ATTS, then inserts the new cluster into the ATTS, and then computes a new ATTS. This new ATTS is distributed to all the Station Interfaces, and communications including the joining station resume at the beginning of the next IDM Message Cycle.

In one embodiment, the non-interfering measurement of propagation times between stations supports the logic for a joining station to connect the network with minimal interference with existing message traffic, and supports the continual process of maintaining optimal performance regardless of whether stations are moving as the TSP solution, according to one embodiment, is an approximation, and the Station Interfaces continually evaluate and improve the ATTS path length.

During every normal IDM Message Cycle, each Station Interface computes the propagation delay to ATTS members by timing the round-trip propagation time. When each IDM Message Cycle begins, the first ATTS station inserts into its message header a propagation time of zero. As the IDM Message Cycle proceeds, each station includes in its header message the cumulative propagation time since that IDM Message Cycle.

The propagation time from the joining station to any given station of a cluster can then be determined. During the initial message exchange with the Inviting Station Interface, the joining Station Interface measures the round-trip propagation time to the Inviting Station Interface. A message received from any station contains the accumulated propagation time from the beginning of the IDM Message Cycle. The propagation time from the joining station to the source of that message is computed as the accumulated propagation time minus its propagation time from the Inviting Station Interface as measured above.

Classical TSP algorithms for large systems typically begin with a good approximation to the solution and then refine that solution, continually moving it towards the absolute optimum. These refinement techniques come in two forms: macro analyses including Monte Carlo style random perturbations of the solution in the hope of escaping a local minimum, and local optimizations removing obvious inefficiencies, such as four stations connected in an "X" pattern rather than a box.

The results of the clustering algorithm may not necessarily be globally optimal due to the assembly of the paths connecting cluster local paths. An ATTS may be produced with long reaches between cluster ends. One embodiment improves the ATTS dynamically by removing "X" patterns. Referring to FIG. 8, each station, for example station 101*c*, examines the propagation times to its two previous ATTS neighbors on the ATTS, station 101*a* and station 101*b*. If station 101*c*'s propagation time to station 101*a* is less than its propagation time to station 101*b*, then an "X" pattern connection has accidentally formed. Station 101*c* recommends that station 101*a* and station 101*b* be exchanged within the ATTS. This recommendation is propagated to all stations to maintain integrity of the ATTS copies.

During normal network IDM Message Cycles, the authority to transmit is deterministic and no collisions are possible. However, a situation may occur when multiple stations simultaneously attempt the initial dialog to join the BSTTS network, and happen to be close to the same distance from the ATTS Inviting Station. In this case, both joining stations will transmit and a collision may occur, corrupting both messages from the new stations. Many broadcast media do not permit collision sensing. However, if a collision occurs, the Inviting Station will reject the corrupted messages and not respond to them. Each new station will determine from the lack of response from the Inviting Station that its message was lost. As this is only occurs during the joining process, and the only affected stations are the ones not already connected to the operating BSTTS network, there is no significant cost to using larger, random, back-off times for the joining stations to escape further simultaneous join attempts. If both joining stations transmitted their join request, but a collision did not occur, then the network responds to the first request received and ignores subsequent requests, thereby triggering the same back-off response in the remaining station(s) as if a collision had occurred.

Figure 13A:
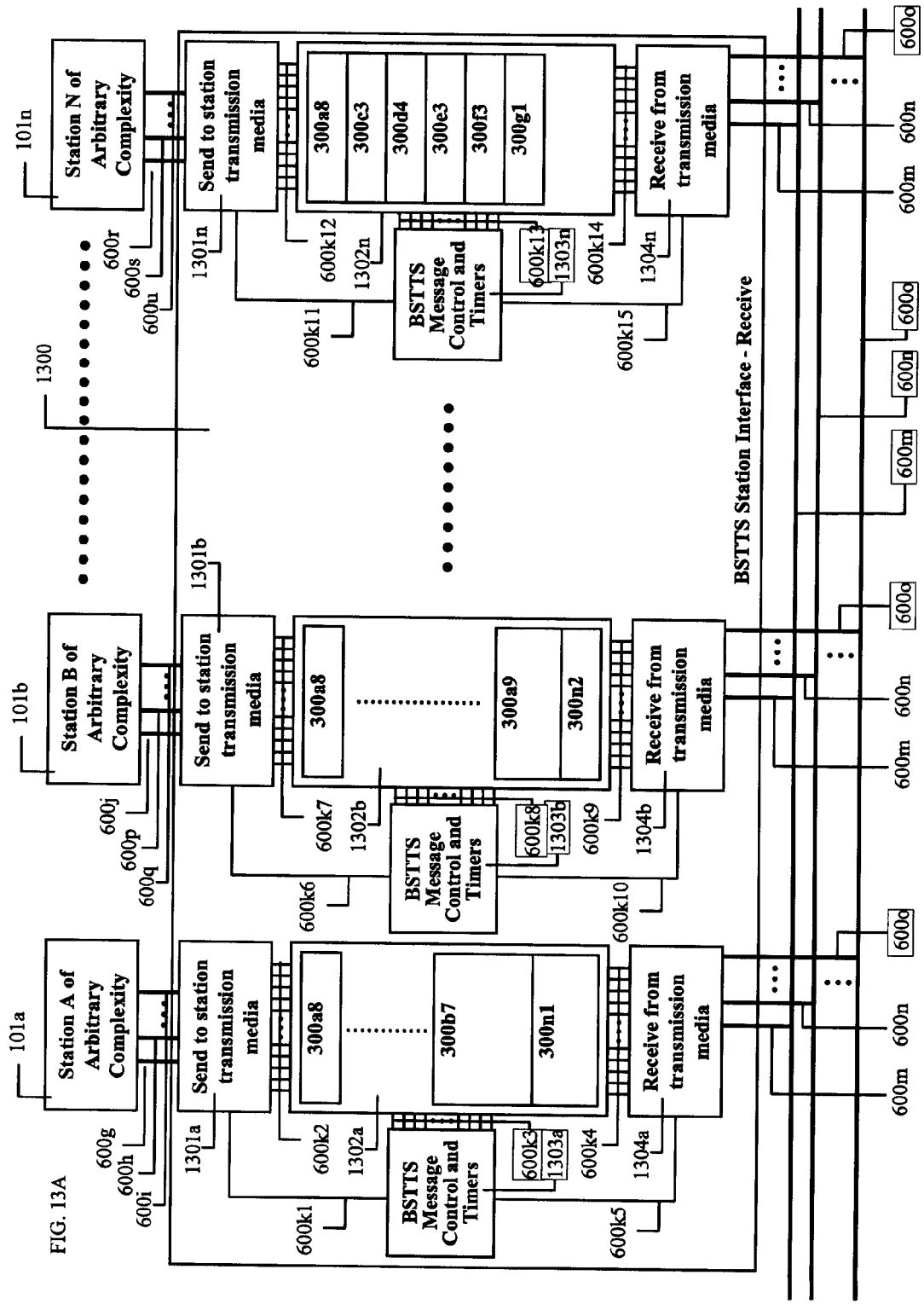
FIGS. 13A and 13B are block diagrams illustrating the functional elements of an exemplary Station Interface.
Figure 13B:
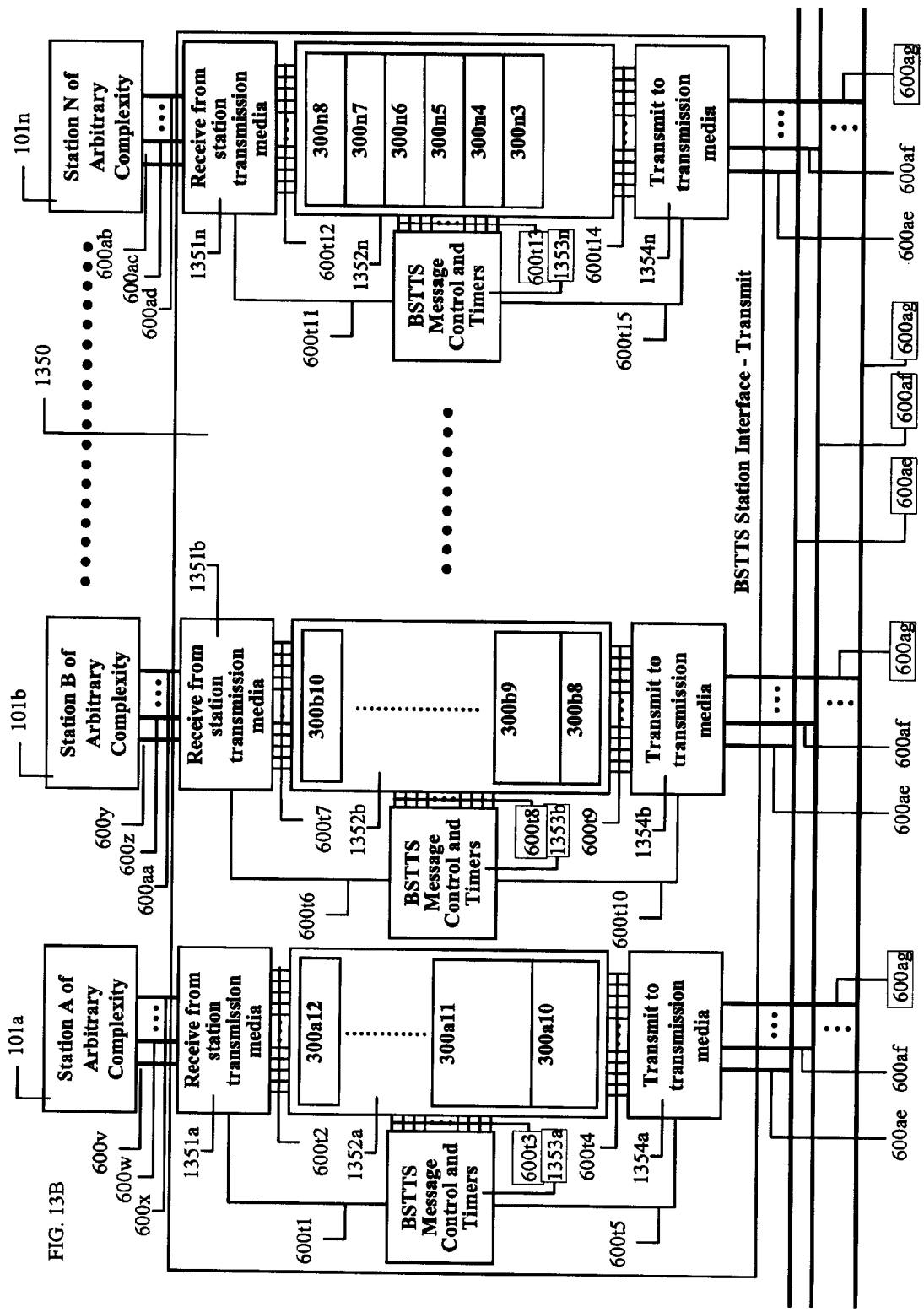

FIGS. 13A and 13B are block diagrams illustrating the functional elements of an exemplary Station Interface 501. For clarity of illustration, the Station Interface 501 is shown and described as a receive-functionality element 1300 and a transmit-functionality element 1350.

FIG. 13A is a block diagram illustrating the receive-functionality element 1300 of an exemplary Station Interface 501. Station Interface 501 receives messages 300 (300$a$8, 300$b$7, 300$n$1, 300$a$9, 300$n$2, 300$c$3, 300$d$4, 300$e$3, 300$f$3, and 300$g$1) from one or more of the same or different transmission media 600$m$, 600$n$ and 600$o$ through one or more receive processing logic units ("Receive From Transmission Media") 1304$a$, 1304$b$, and 1304$n$. Receive processing logic units 1304$a$, 1304$b$, and 1304$n$ send the messages 300, via one or more of the same or different transmission media 600$k$4, 600$k$9, and 600$k$14, to one or more message buffers 1302$a$, 1302$b$, and 1302$n$ units. Message buffers 1302$a$, 1302$b$, and 1302$n$ temporarily store the messages 300 and forward the messages 300 via one or more of the same or different transmission media 600$k$2 600$k$7, and 600$k$12 to one or more transmit processing logic units ("Send To Station Transmission Media") 1301$a$, 1301$b$, and 1301$n$. The transmit processing logic units 1301$a$, 1301$b$, and 1301$n$ units deliver the messages 300 to one or more stations of arbitrary complexity 101$a$, 101$b$, and 101$n$, via one or more of the same or different transmission media 600$g$, 600$h$, 600$l$, 600$j$, 600$p$, 600$q$, 600$r$, 600$s$, and 600$u$. Control of the Station Interface 1300 is implemented with one, two, or a plurality of BSTTS Message Control and Timer units 1303$a$, 1303$b$, and 1303$n$ transmitting and receiving control signals and transmitting and receiving control information via one or more serial and/or parallel, same or different, transmission media 600$k$1, 600$k$3, 600$k$5, 600$k$6, 600$k$8, 600$k$10, 600$k$11, 600$k$13, and 600$k$15. Although the Station Interface 501 is shown as having a receive-functionality element 1300 which has a plurality of transmit processing logic units 1301, message buffers 1302, Message Control and Timers 1303, and receive processing logic units 1304, and as being connected to a plurality of Stations 101, this is not a requirement and a Station Interface 501 may be dedicated to a single station 101 and only have a single receive-functionality element 1300, a single transmit processing logic unit 1301, a single message buffer 1302, a single Message Control and Timer 1303, and a single receive processing logic unit 1304.

FIG. 13B is a block diagram illustrating the transmit-functionality element 1350 of an exemplary embodiment Station Interface 501. Station Interface 501 receives, from one or more stations 101$a$, 101$b$, and 101$n$, via one or more of the same or different transmission media 600$v$, 600$w$, 600$x$, 600$y$, 600$z$, 600$aa$, 600$ab$, 600$ac$, and 600$ad$, messages 300 (300$a$10, 300$a$11, 300$a$12, 300$b$8, 300$b$9, 300$b$10, 300$n$3, 300$n$4, 300$n$5, 300$n$6, 300$n$7, and 300$n$8) by the use of one or more receive processing logic units ("Receive From Station Transmission Media") 1351$a$, 1351$b$, and 1351$n$. Receive processing logic units 1351$a$, 1351$b$, and 1351$n$ route messages 300 by way of one or more of the same or different transmission media 600$t$2, 600$t$7, and 600$t$12 to one or more message buffers 1352$a$, 1352$b$, and 1352$n$. Message buffers 11352$a$, 1352$b$, and 1352$n$ temporarily store messages 300 and then forward messages 300 via one or more of the same or different transmission media 600$t$4, 600$t$9, and 600$t$14 to one or more transmit processing logic units ("Transmit To Transmission Media") 1354$a$, 1354$b$, and 1343$n$. Transmit processing logic units 1354$a$, 1354$b$, and 1343$n$ deliver messages 300 to one or more of the same or different transmission media 600$ae$, 600$af$, and 600$ag$. Control of the Station Interface 1350 is implemented with one or more BSTTS Message Control and Timer Units 1353$a$, 1353$b$, and 1353$n$, which transmit and receive control signals and transmitting and receiving control information via one or more of serial and/or parallel, same or different, transmission media 600$t$1, 600$t$3, 600$t$5, 600$t$6, 600$t$8, 600$t$10, 600$t$11, 600$t$13, and 600$t$15. Although the Station Interface 501 is shown as having a transmit-functionality element 1350 which has a plurality of receive processing logic units 1351, message buffers 1352, Message Control and Timers 1353, and transmit processing logic units 1354, and as being connected to a plurality of Stations 101, this is not a requirement and a Station Interface 501 may be dedicated to a single station 101 and only have a single transmit-functionality element 1350, a single receive processing logic unit 1351, a single message buffer 1352, a single Message Control and Timer unit 1353, and a single transmit processing logic unit 1354.

It will be appreciated that many of the components shown therein may be shared. For example, units 1301 and 1351 may be part of a single interface with a Station 101. Likewise, units 1304 and 1354 may be part of a single interface with a communications media 600. In addition, the control and timer units 1303 and 1353 may be a single unit which controls both transmit and receive operations. And, in addition, buffers 1302 and 1352 may be part of the same memory unit, or even part of the control and timer unit 1303, 1353.

Also, a single unit 1301$a$ may be used, for example, to demultiplex slower signals to two or more stations 101$a$, 101$b$ . . . and 101$n$ from a Station Interface 1300. Further, a single unit 1351$a$ unit may multiplex signals from two or more stations 101$a$, 101$b$ . . . and 101$n$ to a Station Interface 1350.

The performance of networks constructed and operated as described herein can be easily ascertained and documented, with minimal to no performance penalty to network operations. In one embodiment, by listening to the messages traveling on the transmission media, any and all of the Station Interfaces can gather network statistics and create an event log documenting network performance. In another embodiment, a network may have dedicated Station Interfaces that gather network statistics and create an event log documenting the performance of the network. In yet another embodiment, another system monitors the communications on the network and records the associated performance, for example for performing and gathering on-line test results, diagnostic information, and prognostic information.

If one considers the ATTS to be a list, the reverse ATTS may be a separate list, or may be the same list but executed in the opposite direction.

Also, a station may switch from using a forward ATTS to a reverse ATTS at any point which is convenient and which does not introduce error or uncertainty. For example, when a station is implementing the forward ATTS the station may switch to implementing the reverse ATTS once the last station listed in the forward ATTS has transmitted, may switch to implementing the reverse ATTS once its successor or one or more other subsequent stations in the forward ATTS has or have transmitted, may switch to implementing the reverse ATTS once it detects one or more other stations transmitting in the order specified in the reverse ATTS, may switch to implementing the reverse ATTS once it has transmitted, especially if it is at an endpoint (the first or last station) on the ATTS, etc.

Generally, a station monitors the transmissions of other stations and will transmit a message when it has received a message from its immediate predecessor station, giving due consideration to whether the forward ATTS or the reverse ATTS is in effect. Also, giving due consideration to whether the forward ATTS or the reverse ATTS is in effect, a station will transmit a message when it has detected the failure to timely receive a message from its immediate predecessor station.

As a station knows the order of transmission from the ATTS or the reverse ATTS, and has either determined or been provided the propagation time with respect to each other station, or at least some of the other stations, preferably at least two or three predecessor stations as listed in the ATTS or the reverse ATTS as appropriate, a station will know, once a message has been received from one predecessor station, how long the delay should be before a message from a next predecessor station (next in the ATTS) is received.

For example, if there a five stations, A-E (not shown), and station E receives a message from station A, station E will know when it should begin receiving a message from station B and, once station E has received the message from station B, station E will know when it should begin receiving a message from station C and, once station E has received the message from station C, station E will know when it should begin receiving a message from station D. Therefore, if station E does not begin receiving a message from station D by that time, or shortly thereafter, for example, a nominal delay time so as to compensate for processing time, movement of the stations, etc., then station E will determine that station D has dropped out, and station E will begin transmitting. The other stations will also act accordingly, based upon their own propagation delay time calculations and nominal times. Once a station has determined that another station has dropped out it removes that station from the ATTS.

Optionally, if station E receives a message from station B, but does not receive a message from station C, station E will determine that station C has dropped out. Station E will expect to receive a message from its predecessor, station D, within two nominal delay times, one nominal delay time for station D to determine that station C has dropped out, and one nominal delay time for the expected transmission from station D. If station E does not receive a message from station D within this time then station E will determine that station D has also dropped out. The other stations will also act accordingly, based upon their own propagation delay time calculations and nominal times.

From the above, many of the benefits of, and features provided by, the present invention will now be apparent. Some examples of those benefits and features are given below.

Systems containing one, two or a plurality of common paths supplied by one, two or a plurality of joining paths, for example, but not limited to, home networks, industrial process control networks, server access management, storage device and systems management, vehicular traffic management, air traffic management, rail-based traffic management, manufacturing work flow management, logistics flow management, transport vehicle packing, and transport vehicle load control can be implemented using, and benefit from, the teachings herein.

BSTTS networks might be linear, and/or branched, and/or moving in 4-dimensional space-time.

Station Interfaces can be automatically added to and/or deleted from the BSTTS network.

The BSTTS network stations may be as simple as remote sensors supplying information to other users, digital radios carried by vehicles, and/or individuals, and/or stationary, gateways to other networks, and/or stations of arbitrary complexity.

BSTTS networks are self organizing and Self-Managed and human interaction is not required to construct and to maintain network optimal performance. Therefore, Self-Managed-Efficient ad hoc networks and Self-Managed-Efficient ad hoc networks of networks are possible and can be dynamically organized and managed. A network may consist of a few Station Interfaces to tens-of-thousands of collocated and/or distributed Station Interfaces.

The bandwidth and the throughput available to all Station Interfaces are maximized by ensuring that, at any given time, only one Station Interfaces has the authority to transmit.

Station Interfaces are self-aware in that each active Station Interface records information such as, but not limited to, the activities of other Station Interfaces and the relative propagation times to Station Interfaces. Because of this self-awareness, the Station Interfaces do not require continual attention from a network administrator because, for example, network status is always available at and known to every Station Interface.

There is little or no need for collision detection, and/or collision management, and/or arbitration because the ATTS used in the BSTTS network prevents transmission media message collisions.

BSTTS networks operate seamlessly over a wide range of network diameters and across communications media boundaries.

BSTTS networks provide for efficient transmission of a wide range of message sizes and message structures.

BSTTS networks permit transmission and message reception acknowledgement to and from to all the BSTTS network Station Interfaces in a single IDM Message Cycle.

BSTTS networks permit: broadcasting to all Station Interfaces, multicast to any subset of the Station Interfaces, and/or one or more point-to-point transmissions between Station Interfaces in a single IDM Message Cycle.

BSTTS network performance, with respect to bandwidth, scales essentially linearly with message size and number of users.

BSTTS networks significantly increases the throughput available to each user or station connected via Station Interfaces to one, two or a plurality of network media physical layers.

The BSTTS methods and devices can be utilized in any number of different network physical and topological configurations.

One, two, a plurality, or all Station Interfaces on a composed BSTTS network may transmit within the time span of a network diameter.

BSTTS network performance is a priori deterministic and its performance can easily be determined before the network is built.

One, two or a plurality of stations of arbitrary complexity can be connected to one, two or a plurality of the same or different transmission media 600 by way of one, two or a plurality of Station Interfaces.

Many physical implementations are possible. Implementation may be, for example, by processing logic that may comprise hardware (such as, but not limited to, dedicated logic circuitry, programmable logic circuitry and firmware), software (such as, but not limited to, instructions run on a general purpose computer system or a dedicated machine), or combinations of all types of processing logic. Instructions (also known as computer programming instructions, computer programs, software, firmware, or reconfigurable logic circuitry) may be stored in the memory and logic circuitry of the Station Interfaces and/or the Station. In one embodiment Station Interface instructions may be received via the transmission media 600 connected to Station Interfaces. In another embodiment Station Interface instructions may be received from the Station. In yet another embodiment Station Interface instructions may be received via a dedicated media connected device of arbitrary complexity connected to Station Interfaces.

Stations 101 may be of any arbitrary complexity as represented by, but not limited to: U.S. Pat. No. 6,983,075 to Schwartz, et al., January 2006; U.S. Pat. No. 6,973,513 to Chhabra, et al., December 2005; U.S. Pat. No. 5,742,608 to Randrianaliminana, et al., April 1998; U.S. Published Application US2005/0243857A1 by Hofstaedter, et al., November 2005; U.S. Published Application US2005/0190701A1 by Benjerano, et al., September 2005; U.S. Published Application US2005/0190731A1 by Benjerano, et al., September 2005; U.S. Published Application US2005/0135406A1 by Fleming, June 2005; U.S. Published Application US2004/0252716A1 by Memazie, December 2004; U.S. Published Application US2004/0076173A1 by Marchetto, April 2004; U.S. Published Application US2004/0001503A1 by Manter, January 2004; U.S. Published Application US2002/0126693A1 by Stark, et al., September 2002; and U.S. Published Application US2002/0097741A1 by Tonella, July 2002; all of which are hereby incorporated herein by reference.

BSTTS messages 300 may be formed by adding to the standard message packet used by many system embodiments and known to one skilled in the art, such as, but not limited to, the fundamental frame layout used historically and commonly in networking, for example, but not limited to FIG. 13 of U.S. Published Application US2002/0101874A1 by Whittaker, et al., August 2002; and U.S. Published Application US2002/0126691A1 by Strong, September 2002; all of which are hereby incorporated herein by reference.

Lengthy strings of all 1 or all 0 values may allow the Station Interfaces phase-locked loops detecting data frequency and/or phase to drift. Correcting for this drift can take time and can limit the bandwidth and throughput. Information delivery in many network environments is improved if every byte of data is actually encoded with additional control bit(s) to eliminate lengthy strings of all 1 or all 0 values as described, for example, but not limited to, U.S. Pat. No. 4,486,739 to Franaszek et al., incorporated herein by reference. Such encodings are also used to enhance error correction at the byte level.

The various embodiments and approaches described above may be used in various combinations. While specific examples of systems, procedures and operations have been shown, based upon a reading thereof variations and modifications of the embodiments disclosed herein will become apparent to one of skill in the art. Thus, the scope of the present invention should be determined by the appended claims and their legal equivalents without being limited by exemplary embodiments disclosed herein.

APPENDIX A

Discussion of the Prior Art

The Prior Art Discussed Below is Hereby Incorporated by Reference Herein, as if Completely Set Forth in the Specification.

U.S. Pat. No. 6,956,814 to Campanella, U.S. Pat. No. 6,922,388 to Laroja, et al., U.S. Pat. No. 4,731,880 to Ault et al., U.S. Pat. No. 5,434,861 to Pritty et al., U.S. Pat. No. 5,517,622 to Ivanoff, et al., U.S. Pat. No. 5,732,086 to Liang et al., U.S. Published Patent Application U2005/0243857A1 by Hofstaedter, et al., U.S. Published Patent Application U2005/0047429A1 by Koo, et al., U.S. Published Patent Application U2004/0013128A1 by Moreton, et al., U.S. Published Patent Application U2003/0128665A1 by Bernhard, et al., U.S. Published Patent Application U200210044565A1 by Park, et al., and U.S. Published Patent Application US 2001/0033579A1 by Nelson, Jr., et al. describe network implementations that force-fit users transmitted messages onto the transmission media using such techniques as Time Division Multiplexing (TDM) and Time Division Multiple Access (TDMA), Frequency Division Multiplexing (FDM) and Frequency Division Multiple Access (FDMA), a combination of FDM/TDM and FDMA/TDMA or TDM/FDM and TDMA/FDMA, or Code Division Multiplexing (CDM) and Code Division Multiple Access (CDMA), or Orthogonal Frequency Division Multiplexing (OFDM) and Orthogonal Frequency Division Multiple Access (OFDMA), at the expense of optimum bandwidth utilization and network complexity in contrast to most users' needs for increasing network speed and network simplification.

Ethernet Protocol

Networking standards, such as, but not limited to, IEEE 802.3 Ethernet, U.S. Pat. No. 6,751,231 to Fellman, et al., U.S. Pat. No. 6,704,302 to Einbinder, et al., U.S. Pat. No. 6,633,572 to Olshansky, et al., U.S. Pat. No. to 6,370,115 Smith, U.S. Pat. No. 6,320,870 to Thaler, U.S. Pat. No. 6,029,202 to Frazier et al., U.S. Pat. No. 5,995,549 to Crane, U.S. Pat. No. 5,850,525 to Kalkunte, et al., U.S. Pat. No. 5,838,688 to Kadambi, et al., U.S. Pat. No. 5,568,476 to Sherer, et al., and U.S. Published Patent Application U2004/0223503A1 by Lynch show the shortcomings of Ethernet but fail to deliver adequate performance in the face of the increasing network speed and complexity. Nevertheless, due to the inherent user community familiarity with, and low cost of mass-produced components for, Ethernet is one of the most common network protocols. The primary problem with the Ethernet networks is the dependence on Carrier Sense Multiple Access/Collision Detection (CSMA/CD) to establish the right of a station to transmit on a shared medium by detecting and/or avoiding message collisions. It has been shown that this method allows no more than 30% of the available bandwidth on a communications medium to be utilized. In attempts to recover this lost bandwidth, current high-speed networks have abandoned CSMA/CD in favor of point-to-point connections between layers of hubs, routers, and switches. This architecture merely moves the performance problem from that of bandwidth utilization to that of network latency as the accumulation of switch after switch builds up delay between the sender of a message and its recipient.

Token Ring Protocol

Perhaps the earliest typical attempt to form an efficient network is by using a token ring network, such as described in U.S. Pat. No. 6,449,283 to Chao, et al., U.S. Pat. No. 5,890, 001 to Hall, U.S. Pat. No. 5,517,622 to Ivanoff, et al., U.S. Pat. No. 5,402,422 to Liu, et al., U.S. Pat. No. 5,400,323 to Frenzell, III, et al., U.S. Pat. No. 5,377,187 to Spiotta, et al., U.S. Pat. No. 5,245,605 to Ofek, U.S. Pat. No. 4,926,419 to Whipple, and U.S. Published Patent Application US2004/0223503A1 by Lynch. Token rings inefficiently and expensively implement message transmission by passing a token message around a ring of stations. This ring of stations might actually be point-to-point connections between stations that have no ability to reconfigure without major manual rewiring efforts. More frequently, it is implemented in a star configuration where each station is wired to a central hub and jumper wires establish the transmission order. This configuration enables some degree of reconfiguration by manually moving jumper wires. Nevertheless, in either physical configuration, stations are permitted to transmit when the token arrives empty at their input port. If the token is not empty when it arrives, then the message it contains is passed on around the ring until the sending station resets its contents flag.

The token ring approaches are limiting in a number of respects. Data transmission is unidirectional around the ring, not multi-directional, thereby increasing the average latency before the receiving station sees the message. Multidirectional transmission may be achieved through the added expense and added complexity of multiple paths around the ring. Each station must ingest the incoming token, process it and then create a new message that is either a copy of the received token or a new token with a new payload. This introduces further and significant latency to the round trip time. The time to process the token also limits the maximum attainable throughput. Adding or deleting stations from such a ring is a manual process, thereby prohibiting any notion of dynamic membership in the network.

Clocked Network Protocol

Previously, clocked networks, such as described in U.S. Pat. No. 5,434,861 to Pritty et al. focused on providing deterministic communications on a shared data bus among a small fixed number of stations. The key to understanding that implementation is the concept of a "network diameter." This is the time it takes for a signal to propagate from a source at one extreme of the network to a receiver at the furthest extreme of the network, and then back to the source. This communications environment is a predetermined, small number of nodes in fixed configurations on electrical data buses that may be bidirectional or unidirectional and connected in static configurations that are in linear, branched or star form. Like its Ethernet predecessor, a limitation is that only one station is allowed to transmit within the time span of a network diameter. Deterministic behavior is established by requiring that a unique fixed delay time be established for each node at system initialization. The values of these delays are in whole multiples of the network diameter, thereby permitting only one node the authority to transmit in one network diameter. If a station is not ready to transmit when its time arrives, then the network diameter delay allocated to that station remains unused, thereby wasting the bandwidth and limiting the network throughput. While Pritty discloses allowing stations to leave and later rejoin the network, no unexpected arrivals are permitted, because the total membership is defined at system initialization. A polling master node sends a signal on the bus that offers to each station the opportunity to transmit after its built-in delay. A standby polling master will assume the duties of managing the data flow if the first polling master fails.

Pritty describes an elegant and limited solution to a very narrow problem domain, but the solution lacks the flexibility or efficiency to provide well-organized, Self-Managed-Efficient ad hoc networking because each node is going to consume one network diameter of bandwidth, there is no ability to add stations that are not included at system initialization, a second failure of the polling node prevents the system from operating and, even with a small number of stations, a system administrator is required to establish a unique time delay value for each node.

Master-Slave Protocols

A number of master-slave networks have been developed over the years for specific applications, such as, but not limited to, MIL-STD-1553, IEEE 1394 (FireWire), Round Robin, Self-Aware networks, and Fiber Optic Bus Wavelength Division Multiplexing protocol.

MIL-STD-1553 uses a master controller to implement a predetermined message schedule by commanding each station on the bus to transmit at the appropriate time. Although slow by today's standards, this protocol does ensure that data are delivered at exactly the right time. It is, however, completely inflexible with respect to addition of stations, is confined to specific transformer-coupled electrical devices, and permits only 31 nodes to be connected to any one bus.

IEEE 1394 (FireWire) is a commercial standard implementation that allows high-speed devices to communicate synchronously using clocked frames at a nominal 8 kHz, as discussed in U.S. Pat. No. 7,023,874 to Hauck, et al., U.S. Pat. No. 6,970,481 to Gray III, et al., U.S. Pat. No. 6,947,442 to Saito, et al., U.S. Pat. No. 6,904,044 to Duckwall, et al., U.S. Pat. No. 6,771,668 to Fukunaga, et al., U.S. Pat. No. 6,765,923 to LaFollette, et al., U.S. Pat. Nos. 6,721,330 and 6,711,173 to Duckwall, et al., U.S. Pat. No. 6,643,723 to Heighway, et al., U.S. Pat. No. 6,636,526 to Nyu, U.S. Pat. No. 6,496,485 to Le, U.S. Pat. No. 6,480,869 to Saito, et al., U.S. Pat. No. 6,463,472 to Van Loo, U.S. Pat. No. 6,457,081 to Gulick, U.S. Pat. No. 6,389,501 to Garney, et al., U.S. Pat. No. 6,366,968 to Hunsaker, U.S. Pat. No. 6,298,406 to Smyers, U.S. Pat. No. 6,295,516 to Takeyasu., U.S. Pat. No. 6,233,615 to Van Loo, U.S. Pat. No. 6,161,104 to Stakutis, et al., U.S. Pat. No. 6,065,052 to Van Loo, U.S. Pat. No. 5,802,057 to Duckwall, et al., U.S. Pat. No. 5,802,048 to Duckwall, and U.S. Published Patent Application US20020085581A1 to Hauck, et al., U.S. Published Patent Application US20020093977A1 to Ono, et al.

The devices, each of which has a unique identification (ID) code, are organized on the bus in a tree topology. One of the nodes is elected root node and always has the highest ID. The IDs are assigned during the self-id process that happens after each bus-reset. Each device must request from the controller the right to use one of two "isochronous" channels (where transmission is permitted every frame) or to make asynchronous use of the remaining bandwidth in each data frame. The isochronous channels cannot guarantee delivery of the data, the maximum message size is a function of the cable speed, and any data exchange has to run at the speed of the slowest device involved. While IEEE 1394 is an excellent mechanism for connecting high-speed peripherals to a central processor, it does not meet the requirements of ad hoc networking. It is confined to specific electrical connections, permits a limited number of devices, and has limits on the range between any pair of devices and the message size.

"Round Robin" global bus system have been implemented, such as those described in U.S. Pat. No. 6,975,324 to Valmiki, et al., U.S. Pat. No. 5,883,894 to Patel, et al., U.S. Published Patent Application US20040001502A1 to Garmire, et al., U.S. Published Patent Application US20030108060A1 to Black, et al., U.S. Published Patent Application US20030108061A1 to Black, et al., U.S. Published Patent Application US20030043840A1 to Kurokawa, et al., and U.S. Published Patent Application US20020044565A1 to Park, et al. In the embodiment described by Park, a bus master (parent) polls the slaves (children) for their status and assigns to each a time slot using TDM methodology. While this implementation can provide timely delivery of data, it is still confined to the world of electrical control signals, and TDM essentially wastes the bandwidth allocated to idle transmitters.

Existing Self-Aware Networks

Self-aware networks such as, but not limited to U.S. Pat. No. 5,732,086 to Liang et al. attempt to provide message transmission functionality in an ad hoc environment. The system needs one node to be appointed as an "originating node" with the responsibility of determining and maintaining the network topology. The environment in which it operates must permit full duplex transmission links between all nodes. The originating node initially polls all stations, determines by their acknowledgement their topology entry, and initiates normal operation. An "event" might cause that originating node to perform topology repairs by repeating portions of the polling operation. Other nodes on the network remain unaffected if their status in the topology has not changed. While attempting to approach dynamic network topology management, this approach, and others of its kind, fall short because all the nodes are wired with two-way links, thereby preventing the inclusion of unexpected nodes. Event detection is accomplished by nodes communicating a change of state to one of the active nodes, and when an event is detected, all communications stop until the topology is re-established. While this may be satisfactory fine for a very small number of stations and small network diameters, the bandwidth cost of these interruptions becomes prohibitive in a dynamic environment with a large number of stations.

Fiber Optic Bus Wavelength Division Multiplexing Protocol

U.S. Published Patent Application US2002/0101874A1 by Whittaker et al. attempts to overcome the limitations of TDM, FDM and combinations of TDM and FDM implementations for a plurality of stations on a real-time ad hoc network. It combines the best characteristics of the Token Ring, Clocked, Master-Slave and Self-Aware network topologies, and is designed for use on a linear optical data bus into which all nodes are tapped rather than point-to-point links. Separate, unrelated implementations such as disclosed in U.S. Pat. No. 5,898,801 to Braun et al., and U.S. Published Patent Application US2004/0076434A1 by Whittaker et al. allow this tapping to occur without loss of signal energy on the bus at the expense of diminished Signal to Noise ratio. While designed to operate on a linear bus, those implementations can be extended to work (with a significant loss of effective bandwidth) on either a branching bus or in a broadcast medium.

Whittaker allows all stations the opportunity to transmit within the space of one network diameter, thereby greatly improving the bandwidth utilization. Referring to the transition of the authority to transmit from one end of the transmission order to the other as one cycle, at the beginning of a cycle, before any data are transmitted, a node designated as the Starting Bus Master (SBM) sends out a Beginning of Sequence (BOS) message that resets all the active nodes on the bus. At the end of the cycle, the last node on the transmission order, the Ending Bus Master (EBM), sends out an End of Sequence (EOS) message after its data message. Between these two messages, every active node has had the opportunity to send a message. If it had none to send, a node sends a synchronization message to transfer the transmit authority to its successor on the transmission order.

Whittaker dynamically computes the transmission order by the SBM, which is enabled by the presence of the EOS message. When the SBM sees the EGS message, instead of starting the next cycle immediately, it pauses for one network diameter to allow a joining station to identify itself. Such a joining station would see the EOS message and immediately transmit a request to join the network. When such a request is granted, data transmission is suspended in a manner similar to that of the self-aware network. A joining SBM is assigned by the joining station to be the node furthest from that joining station. The assigned SBM then measures its distance from all the other nodes including the joining station by pinging each station of interest, receiving a response, and recording the round-trip time accomplish each of these distance measurements. The assigned SBM then forms the new transmission order by sorting the nodes by distance and begins a fresh data cycle.

While Whittaker discloses an improved approach to providing network capability for ad hoc networks, Whittaker also has a number of limitations to providing optimum throughput, such as: in any Master/Slave embodiment, the use of a SBM and an EBM to maintain system operation causes serious concerns for system integrity and reliability in the face of the failure of either master node; by using BOS and EOS messages and pausing every cycle for a network diameter, a significant portion of the bandwidth remains lost; when a new station joins the network, as the number of nodes increases, the amount of time consumed by the process of interrogating all the nodes (twice) becomes prohibitive, thereby preventing the system from guaranteeing timely delivery of data in an ad hoc environment; and the algorithm for determining the transmission order only develops efficient sequences on a linear bus without branches. In a branched networks or free space networks, this algorithm tends to develop exactly the wrong sequence of nodes because it orders their transmission by their distance from the master node.

Collision Avoidance, Detection, and Management

U.S. Pat. No. 7,012,927 to Nichols, U.S. Pat. No. 7,009,993 to Pronk, U.S. Pat. No. 7,006,521 to Nguyen, U.S. Pat. No. 7,006,469 to Roark, U.S. Pat. No. 7,002,984 to Cheng, U.S. Pat. No. 6,993,042 to Akatsuka, U.S. Pat. No. 6,990,072 to Alasti, U.S. Pat. No. 6,980,562 to Rudolf, U.S. Pat. No. 6,980,561 to Abi-Nassif, U.S. Pat. No. 6,977,919 to Stanwood, U.S. Published Patent Application US200610056440A1 by Khartabil, U.S. Published Patent Application US2006/0039400A1 by Mukhopadhyay, U.S. Published Patent Application US2006/0039342A1 by Frank, U.S. Published Patent Application US2005/0276276A1 by Davis, and U.S. Published Patent Application US2005/0243858A1 by Vitebsky; all of which are hereby incorporated herein by reference, disclose collision detection, and/or collision management, and/or arbitration, and/or contention processing logic. However, these inventions may not operate as well in an environment where stations are joining and dropping out.

We claim:

1. A method of operating a station in a network comprising a plurality of stations, each station being capable of transmitting and receiving, the method comprising:
   (a) obtaining an Authorization To Transmit Sequence (ATTS) which specifies the order in which the stations may transmit, the ATTS listing a first station, at least one intermediate station, and a last station;

(b) defining a reverse ATTS based upon the ATTS, the order in which the stations may transmit being reverse to the order of the ATTS defined in step (a);
(c) receiving messages;
(d) inspecting each message to determine if it was from a predecessor station in the ATTS or in the reverse ATTS; and
(e) if the message was from a predecessor station then, once that message is complete, transmitting a message.

2. The method of claim 1 and further comprising:
estimating the time at which a message from the predecessor station should be received;
if that estimated time has passed and a message has not been received from the predecessor station then transmitting a message.

3. The method of claim 1 and further comprising:
estimating the time at which a message from the predecessor station should be received;
if that estimated time has passed and a message has not been received from the predecessor station then removing that predecessor station from the ATTS and the reverse ATTS.

4. The method of claim 1 and further comprising:
estimating the time at which a message from the predecessor station should be received;
if that estimated time has passed and a message has not been received from the predecessor station then transmitting a message and removing that predecessor station from the ATTS and the reverse ATTS.

5. A method of operating a station in a network comprising a plurality of stations, each station being capable of transmitting and receiving, the method comprising:
(a) obtaining an Authorization To Transmit Sequence (ATTS) which specifies the order in which the stations may transmit, the ATTS listing a first station, at least one intermediate station, and a last station;
(b) at a predetermined time, sending a pause message to invite a new station to join the network;
(c) if a reply message is received then sending a station identity and the ATTS to the new station;
(d) receiving a revised ATTS from the new station, the revised ATTS listing the new station; and
(e) transmitting a message in accordance with the revised ATTS.

6. The method of claim 5 wherein step (e) comprises:
inspecting each message to determine if it was from a predecessor station in the revised ATTS; and
(e) if the message was from a predecessor station then, once that message is complete, beginning transmission of a message.

7. A method of operating a joining station, the station wishing to join a network comprising a plurality of stations, each station being capable of transmitting and receiving, the method comprising:
(a) listening on the network for a pause message inviting new stations to join the network;
(b) sending a reply to the pause message;
(c) receiving an Authorization To Transmit Sequence (ATTS) which specifies the order in which the stations may transmit, the ATTS listing a first station, at least one intermediate station, and a last station;
(d) determining propagation times between the joining station and at least some of the stations listed in the ATTS;
(e) determining a position in the ATTS where the joining station should be placed;
(f) defining a revised ATTS listing the joining station in that position;
(g) receiving a message authorizing the joining station to transmit;
(h) transmitting a message, the message including the revised ATTS; and
(i) transmitting further messages in accordance with the revised ATTS.

8. The method of claim 7 wherein step (e) comprises determining the position so as to maintain network efficiency.

9. A method of operating a joining station, the station wishing to join a network comprising a plurality of stations, each station being capable of transmitting and receiving, the method comprising:
(a) listening on the network for a pause message inviting new stations to join the network;
(b) sending a reply to the pause message;
(c) receiving a designation of a Parent Station in a cluster and at least part of an Authorization To Transmit Sequence (ATTS) which specifies the order in which the stations may transmit, the ATTS listing a first station, at least one intermediate station, and a last station, the at least part including stations in the cluster;
(d) determining propagation times between the joining station and at least some of the stations in that cluster which are listed in the at least part of the ATTS;
(e) determining a position in the at least part of the ATTS where the joining station should be placed with respect to the stations in that cluster so as to maintain network efficiency;
(f) defining a revised at least part of the ATTS listing the joining station in that position;
(g) receiving a message authorizing the joining station to transmit;
(h) transmitting a message, the message including the revised at least part of the ATTS; and
(i) transmitting further messages in accordance with the at least part of the revised ATTS.

10. The method of claim 9 wherein the step (c) of receiving at least part of an ATTS comprises receiving a local ATTS, the local ATTS being included within the ATTS.

11. The method of claim 9 wherein step (e) comprises:
determining a plurality of network propagation times, each network propagation time being for a different ordering of transmissions for the at least part of the ATTS and including the joining station, and being based upon propagation times between the joining station and at least some of the stations in that cluster which are listed in the at least part of the ATTS;
determining the minimum propagation time of the plurality of network propagation times;
providing the ordering of transmissions which resulted in the minimum propagation time as a revised at least part of the ATTS.

12. A network, comprising:
a plurality of stations, each station being capable of transmitting and receiving, each station comprising:
a transmitter to transmit messages;
a receiver to receive messages;
a controller functionally connected to the transmitter to control the transmitter, functionally connected to the receiver to process messages received by the receiver, and having a memory to store and retrieve an Authorization To Transmit Sequence (ATTS) which specifies an order in which the stations may transmit, the ATTS listing a first station of the plurality of stations, at least one intermediate station of the plurality of stations, and a last station of the plurality of stations, the controller being responsive to the ATTS and to a reverse ATTS;

the controller of the first station causes the transmitter of the first station to transmit a first message if the ATTS is in effect, and the controller inspects a received message and causes the transmitter of the first station to transmit a second message if the reverse ATTS is in effect and the received message was transmitted by an immediately preceding station in the reverse ATTS;

the controller of each intermediate station inspects a received message and causes the transmitter of the intermediate station to transmit a message if the ATTS is in effect and the received message was transmitted by an immediately preceding station in the ATTS, and causes the transmitter of the intermediate station to transmit a message if the reverse ATTS is in effect and the received message was transmitted by an immediately preceding station in the reverse ATTS; and the controller of the last station inspects a received message and causes the transmitter of the last station to transmit a first message if the ATTS is in effect and the received message was transmitted by an immediately preceding station in the ATTS, and then to transmit a second message;

whereby a sequence of transmission of the stations is for the first station listed in the ATTS to transmit, each intermediate station to transmit in its order of listing in the ATTS, the last station listed in the ATTS to transmit, the last station to transmit again, each intermediate station to transmit in its order of listing in the reverse ATTS, and the first station to transmit again; and whereby the sequence of transmission is executed at least one more time.

13. The network of claim 12 wherein a controller implements a reverse ATTS by reversing the order in the ATTS.

14. The network of claim 12 wherein the controller also causes the transmitter to transmit a message if the ATTS is in effect and a message was not timely received from an immediately preceding station in the ATTS, or causes the transmitter to transmit a message if the reverse ATTS is in effect and a message was not timely received from an immediately preceding station in the reverse ATTS.

15. The network of claim 12 wherein a station further comprises a station interface, and the controller is in the station interface.

16. A station, comprising:
a transmitter to transmit messages;
a receiver to receive messages; and
a controller functionally connected to the transmitter to control the transmitter, functionally connected to the receiver to process messages received by the receiver, and having a memory to store and retrieve an Authorization To Transmit Sequence (ATTS) which specifies when the station may transmit with respect to other stations listed in the ATTS, the ATTS listing a plurality of stations, the plurality of stations having a first station, at least one intermediate station, and a last station, the controller being responsive to the ATTS and to a reverse ATTS to cause the transmitter to transmit;

the controller inspecting a received message and causing the transmitter to transmit a message if the ATTS is in effect and the received message was transmitted by an immediately preceding station in the ATTS, or causing the transmitter to transmit a message if the reverse ATTS is in effect and the received message was transmitted by an immediately preceding station in the reverse ATTS.

17. The station of claim 16 wherein a controller implements a reverse ATTS by reversing the order in the ATTS.

18. The station of claim 16 wherein the controller also causes the transmitter to transmit a message if the ATTS is in effect and a message was not timely received from an immediately preceding station in the ATTS, or causes the transmitter to transmit a message if the reverse ATTS is in effect and a message was not timely received from an immediately preceding station in the reverse ATTS.

19. The station of claim 16 wherein the station is the first station in the ATTS and the controller of the first station causes the transmitter of the first station to transmit a first message if the ATTS is in effect, and the controller inspects a received message and causes the transmitter of the first station to transmit a second message if the reverse ATTS is in effect and the received message was transmitted by an immediately preceding station in the reverse ATTS.

20. The station of claim 16 wherein the station is the last station in the ATTS and the controller of the last station inspects a received message and causes the transmitter of the last station to transmit a first message if the ATTS is in effect and the received message was transmitted by an immediately preceding station in the ATTS, and then to transmit a second message.

21. The network of claim 16 wherein a station further comprises a station interface, and the controller is in the station interface.

* * * * *